(12) United States Patent
Ohta et al.

(10) Patent No.: US 11,677,669 B2
(45) Date of Patent: Jun. 13, 2023

(54) COMMUNICATION DEVICE, RELAY DEVICE, AND COMMUNICATION SYSTEM FOR CONTROLLING GENERATION OF A TCP ACKNOWLEDGEMENT (ACK)

(71) Applicant: FUJITSU LIMITED, Kawasaki (JP)

(72) Inventors: Yoshiaki Ohta, Yokohama (JP); Yoshihiro Kawasaki, Kawasaki (JP); Takayoshi Ode, Yokohama (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/106,942

(22) Filed: Aug. 21, 2018

(65) Prior Publication Data
US 2018/0359191 A1 Dec. 13, 2018

Related U.S. Application Data

(63) Continuation of application No. PCT/JP2016/055028, filed on Feb. 22, 2016.

(51) Int. Cl.
*H04L 47/27* (2022.01)
*H04W 28/02* (2009.01)
(Continued)

(52) U.S. Cl.
CPC .............. *H04L 47/27* (2013.01); *H04B 7/14* (2013.01); *H04L 47/323* (2013.01);
(Continued)

(58) Field of Classification Search
CPC ..... H04L 47/27; H04L 47/323; H04L 69/163; H04L 47/34; H04L 47/18; H04L 47/14; H04W 28/0273; H04W 80/06; H04B 7/14
See application file for complete search history.

(56) References Cited

U.S. PATENT DOCUMENTS 8,107,478 B2 * 1/2012 Naito ................ H04L 47/14
370/412
8,588,068 B2 * 11/2013 Kobayashi ............ H04L 69/163
370/230
(Continued)

FOREIGN PATENT DOCUMENTS

EP 1 633 099 A1 3/2006
JP 2000-295278 A 10/2000
(Continued)

OTHER PUBLICATIONS

WO 2015/011184 A1 (Year: 2015).*
(Continued)

*Primary Examiner* — Rushil Parimal Sampat
(74) *Attorney, Agent, or Firm* — Myers Wolin, LLC; Brian S. Myers

(57) ABSTRACT

A communication device includes, a controller that executes control to receive a data transmission packet from another communication device, create a reception confirmation packet indicating reception of the data transmission packet, and store the created reception confirmation packet in a transmission buffer, and a transmitter that transmits a part of reception confirmation packets stored in the transmission buffer to the other communication device but does not transmit reception confirmation packets other than the transmitted reception confirmation packet to the other communication device.

18 Claims, 19 Drawing Sheets

(51) Int. Cl.
| | |
|---|---|
| H04L 69/163 | (2022.01) |
| H04L 47/32 | (2022.01) |
| H04B 7/14 | (2006.01) |
| H04W 80/06 | (2009.01) |
| H04L 47/34 | (2022.01) |
| H04W 8/04 | (2009.01) |
| H04L 47/10 | (2022.01) |

(52) U.S. Cl.
CPC ....... *H04L 69/163* (2013.01); *H04W 28/0273* (2013.01); *H04W 80/06* (2013.01); *H04L 47/18* (2013.01); *H04L 47/34* (2013.01); *H04W 8/04* (2013.01)

(56) References Cited

U.S. PATENT DOCUMENTS

| | | | |
|---|---|---|---|
| 8,717,900 | B2 | 5/2014 | Williams et al. |
| 10,291,519 | B2* | 5/2019 | Baba .................. H04L 43/0894 |
| 2004/0100979 | A1 | 5/2004 | Mandin et al. |
| 2006/0176862 | A1 | 8/2006 | Ishimori et al. |
| 2009/0013210 | A1* | 1/2009 | McIntosh ............ H04L 41/0672 |
| | | | 714/4.1 |
| 2012/0002565 | A1* | 1/2012 | Amano ............... H04L 43/0882 |
| | | | 370/252 |
| 2012/0188887 | A1 | 7/2012 | Kobayashi |
| 2012/0201136 | A1 | 8/2012 | Williams et al. |
| 2016/0164793 | A1* | 6/2016 | Basu Mallick ......... H04L 47/32 |
| | | | 370/235 |

FOREIGN PATENT DOCUMENTS

| | | |
|---|---|---|
| JP | 2004-180315 A | 6/2004 |
| JP | 2004-364217 A | 12/2004 |
| JP | 2014-017568 A | 1/2014 |
| JP | 2014-509483 A | 4/2014 |
| WO | 2011052201 A1 | 5/2011 |

OTHER PUBLICATIONS

3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 13).
3GPP TS 36.211 V13.0.0 (Dec. 2015); 3rd Generation Partnership Project; Technical Specification Group Radio Access Network; Evolved Universal Terrestrial Radio Access (E-UTRA); Physical channels and modulation (Release 13).
3GPP TS 36.212 V13.0.0 (Dec. 2015); 3rd Generation Partnership Project; Technical Specification Group Radio Access Network; Evolved Universal Terrestrial Radio Access (E-UTRA); Multiplexing and channel coding (Release 13).
3GPP TS 36.213 V13.0.0, (Dec. 2015); 3rd Generation Partnership Project; Technical Specification Group Radio Access Network; Evolved Universal Terrestrial Radio Access (E-UTRA); Physical layer procedures (Release 13).
3GPP TS 36.321 V13.0.0 (Dec. 2015); 3rd Generation Partnership Project; Technical Specification Group Radio Access Network; Evolved Universal Terrestrial Radio Access (E-UTRA); Medium Access Control (MAC) protocol specification (Release 13).
3GPP TS 36.322 V13.0.0 (Dec. 2015); 3rd Generation Partnership Project; Technical Specification Group Radio Access Network; Evolved Universal Terrestrial Radio Access (E-UTRA); Radio Link Control (RLC) protocol specification (Release 13).
3GPP TS 36.323 V13.0.0 (Dec. 2015); 3rd Generation Partnership Project; Technical Specification Group Radio Access Network; Evolved Universal Terrestrial Radio Access (E-UTRA); Packet Data Convergence Protocol (PDCP) specification (Release 13).
3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC); Protocol specification (Release 13).
3GPP TR 36.881 V0.5.0 (Nov. 2015); 3rd Generation Partnership Project; Technical Specification Group Radio Access Network; Evolved Universal Terrestrial Radio Access (E-UTRA); Study on latency reduction techniques for LTE (Release 13).
3GPP TS 23.203 V13.2.0 (Dec. 2014); 3rd Generation Partnership Project; Technical Specification Group Services and System Aspects; Policy and charging control architecture (Release 13).
3GPP TR 36.814 V9.0.0 (Mar. 2010); 3rd Generation Partnership Project; Technical Specification Group Radio Access Network; Evolved Universal Terrestrial Radio Access (E-UTRA); Further advancements for E-UTRA physical layer aspects (Release 9).
RFC793, "Transmission Control Protocol DARPA Internet Program Protocol Specification", dated Sep. 1981; prepared for Defense Advanced Research Projects Agency Information Processing Techniques Office, 1400 Wilson Boulevard, Arlington, Virginia 22209, by Information Sciences Institute University of Southern California, 4676 Admiralty Way, Marina del Rey, California 90291.
RFC896, "Congestion Control in IP/TCP Internetworks", Jan. 6, 1984; Network Working Group; Request for Comments: 896; John Nagle, Jan. 6, 1984, Ford Aerospace and Communications Corporation.
International Search Report issued for corresponding International Patent Application No. PCT/JP2016/055028, dated May 10, 2018. English translation attached.
Written Opinion issued for corresponding International Patent Application No. PCT/JP2016/055028 dated May 10, 2016 with English translation attached.
The partial supplementary European search report issued by the European Patent Office for corresponding European Patent Application No. 16891386.1, dated Jan. 11, 2019.
Notice of Reasons for Refusal issued by the Japan Patent Office for corresponding Japanese Patent Application No. 2018-501417, dated Jun. 18, 2019, with an English translation.
First Notification of Office Action issued by China National Intellectual Property Administration for corresponding Chinese Application No. 201680082312.9, dated Aug. 26, 2020, with a full English translation.
Decision of Refusal issued by the Japan Patent Office for corresponding Japanese Patent Application No. 2018-501417, dated Jan. 14, 2020, with an English translation.

* cited by examiner

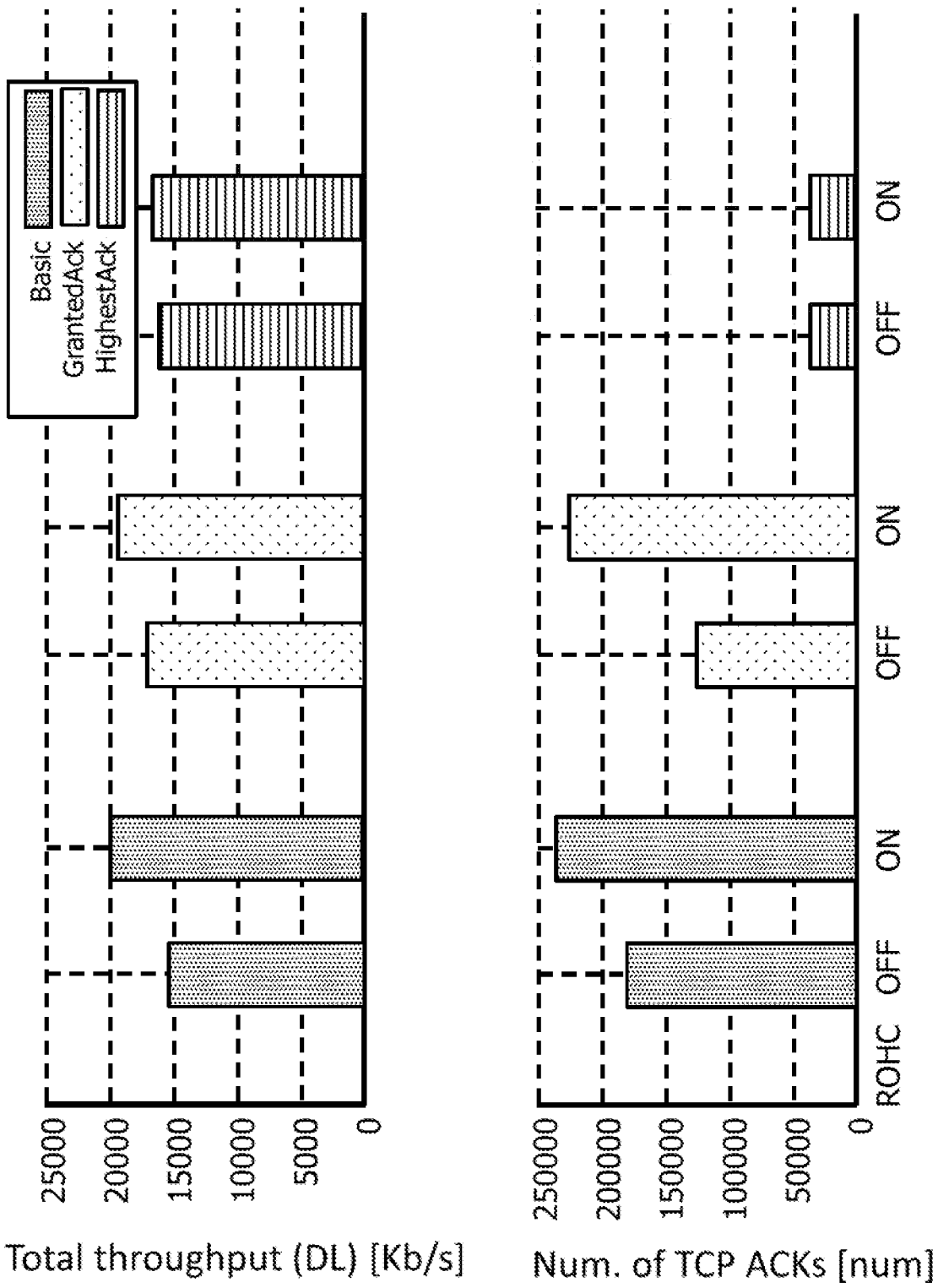

COMMUNICATION DEVICE, RELAY DEVICE, AND COMMUNICATION SYSTEM FOR CONTROLLING GENERATION OF A TCP ACKNOWLEDGEMENT (ACK)

CROSS-REFERENCE TO RELATED APPLICATION

This application is a continuation application of International Application PCT/JP2016/055028 filed on Feb. 22, 2016 and designated the U.S., the entire contents of which are incorporated herein by reference.

FIELD

The present invention relates to a communication device, a relay device, and a communication system.

BACKGROUND

In the standards organization 3GPP (3$^{rd}$ Generation Partnership Project), specifications of an LTE (Long Term Evolution) system and an LTE-A (LTE-Advanced) system based on an LTE system are currently either complete or under investigation.

A communication protocol known as TCP/IP (Transmission Control Protocol/Internet Protocol) may be used for data communication in LTE. TCP/IP is a protocol combining TCP and IP, and is used as standard on the Internet and so on.

In TCP communication, a transmission side communication device transmits a data packet and a reception side communication device, having been able to receive the data packet normally, transmits an ACK (Acknowledgement) in response to the received data packet. The transmission side communication device receives the ACK and then transmits the next data packet. Hence, in TCP communication, it is possible to confirm that the data packet has arrived upon reception of the ACK, and thus, reliable communication is realized.

Technology relating to LTE and TCP/IP is described in the following prior art literature.

CITATION LIST

Patent Literature

Patent Literature 1: Japanese Laid-open Patent Publication No. 2004-180315
Patent Literature 2: Japanese Laid-open Patent Publication No. 2000-295278
Patent Literature 3: Japanese Laid-open Patent Publication No. 2014-17568

Non-Patent Literature

Non-patent Literature 1: 3GPP TS36.300 V13.2.0 (2015-12)
Non-patent Literature 2: 3GPP TS36.211 V13.0.0 (2015-12)
Non-patent Literature 3: 3GPP TS36.212 V13.0.0 (2015-12)
Non-patent Literature 4: 3GPP TS36.213 V13.0.0 (2015-12)
Non-patent Literature 5: 3GPP TS36.321 V13.0.0 (2015-12)
Non-patent Literature 6: 3GPP TS36.322 V13.0.0 (2015-12)
Non-patent Literature 7: 3GPP TS36.323 V13.0.0 (2015-12)
Non-patent Literature 8: 3GPP TS36.331 V13.0.0 (2015-12)
Non-patent Literature 9: 3GPP TR36.881 V0.5.0 (2015-11)
Non-patent Literature 10: 3GPP TS23.203 V13.2.0 (2014-12)
Non-patent Literature 11: 3GPP TR36.814 V9.0.0 (2010-3)
Non-patent Literature 12: RFC793 (1981-09)
Non-patent Literature 13: RFC896 (1984-01)

SUMMARY

A communication device includes, a controller that executes control to receive a data transmission packet from another communication device, create a reception confirmation packet indicating reception of the data transmission packet, and store the created reception confirmation packet in a transmission buffer, and a transmitter that transmits a part of reception confirmation packets stored in the transmission buffer to the other communication device but does not transmit reception confirmation packets other than the transmitted reception confirmation packet to the other communication device.

The present disclosure provides a communication device with which a reduction in communication speed due to ACK transmission can be prevented.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is a graph illustrating numbers of transmitted ACKs and the downlink throughput when a reception confirmation reception processing was simulated.

DESCRIPTION OF EMBODIMENTS

When a large number of ACKs are transmitted during TCP communication, communication resources are used to transmit the ACKs, and as a result, the communication speed of other data to be transmitted may decrease. More particularly, when communication resources are insufficient, a communication delay occurs due to accumulation of the ACKs, and as a result, the data communication speed may decrease. Moreover, when the number of transmitted ACKs increases, an amount of interference in a wireless section also increases.

Embodiments will be described in detail below with reference to the figures. Problems and embodiments described in the present specification are examples, and do not limit the scope of rights of the present application. More particularly, even if expressions used in the description vary, as long as the various expressions mean technically the same matters, the technology of the present application can be applied on the basis of these different expressions without limiting the scope of rights.

First Embodiment

First, a first embodiment will be described.

Figure 1:
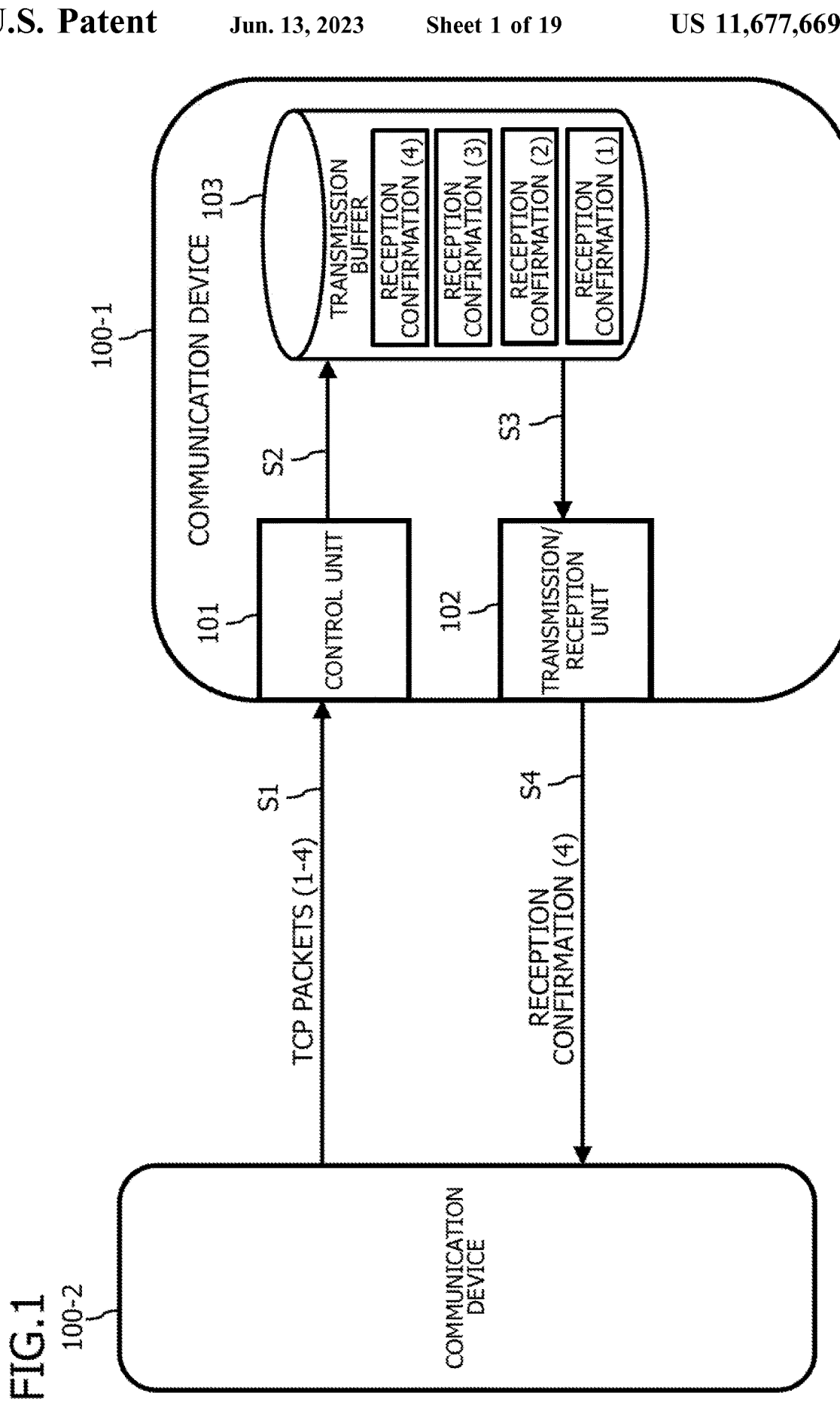
FIG. 1 is a figure depicting an example configuration of the communication system 10.

FIG. 1 is a figure depicting an example configuration of a communication system 10 according to a first embodiment. The communication system 10 includes communication devices 100-1, 2. The communication devices 100-1, 2 are connected to each other either by wire or wirelessly in order to exchange data using packets, for example. Further, the communication devices 100-1, 2 may be connected to each other via a relay device or the like, for example. The communication device 100 is a terminal device such as a portable telephone, or a computer such as a server or a host machine, for example. The communication devices 100-1, 2 communicate with each other on the basis of TCP/IP, for example. Further, the communication devices 100-1, 2 each include a CPU, storage, and a memory, not depicted in the figure, and by loading a program stored in the storage to the memory and executing the loaded program using the CPU, a controller 101 and a transmitter 102 are constructed and respective types of processing are executed. The packets used by the communication system 10 are a TCP packet (a data transmission packet) and a reception confirmation (acknowledgement) packet (an ACK, for example). Hereafter, the term "packet" will be used generally to indicate one or both of the TCP packet and the reception confirmation packet.

The communication device 100-1 includes the controller 101, the transmitter 102, and a transmission buffer 103. The communication device 100-2 has a similar configuration (not depicted in the figure).

The controller 101 receives a TCP packet from the communication device 100-2, and stores a reception confirmation packet indicating reception of the TCP packet in the transmission buffer 103.

When a transmission opportunity arises, the transmitter 102 transmits a part of the reception confirmation packets stored in the transmission buffer to the communication device 100-2, but does not transmit the remaining reception confirmation packets.

The communication device 100-2 transmits TCP packets to the communication device 100-1. The TCP packet includes an identifier or a sequence number (referred to hereafter as a corresponding packet number) of the packet. The corresponding packet number is a numerical value that is incremented every time a TCP packet is transmitted, for example, thereby indicating the transmission order of the TCP packet. Note that as long as the transmission order of the TCP packet can be calculated so that a numerical value can be determined uniquely for each TCP packet, the corresponding packet number may be a numerical value indicating a relationship to data included in a TCP packet transmitted last time, such as a start address of the transmitted data, for example. The communication device 100-2 transmits four TCP packets having corresponding packet numbers 1 to 4, for example (S1).

When the communication device 100-1 receives the TCP packets from the communication device 100-2 (S1), the controller 101 stores reception confirmation packets in the transmission buffer 103 (S2). For example, having received a TCP packet (1) (meaning the TCP packet having the corresponding packet number 1; likewise hereafter), the controller 101 creates a reception confirmation packet (1) (meaning the reception confirmation packet having the corresponding packet number 1, also referred to as ACK (1); likewise hereafter), and stores the created reception confirmation packet (1) in the transmission buffer 103. The controller 101 creates corresponding reception confirmation packets and stores the created execution characters in the transmission buffer 103 in a similar manner every time a TCP packet is received. As a result, reception confirmation packets (1) to (4) are stored in the transmission buffer 103.

When a packet transmission opportunity next arises, the transmitter 102 extracts a part of the reception confirmation packets stored in the transmission buffer (S3), and transmits the extracted reception confirmation packets to the communication device 100-2 (S4). Transmission opportunities arise asynchronously with TCP packet reception when, for example, a packet transmission wait timer times out, packets are stored in the transmission buffer up to a predetermined size, a base station device (a communication device 200-2, for example) grants uplink transmission permission (UL Grant) to a mobile terminal device (a communication device 200-1, for example), and so on.

In the example depicted in FIG. 1, the communication device 100-1 transmits the reception confirmation packet (4) as a part of the reception confirmation packets. The reception confirmation packet (4) is the reception confirmation packet relating to the most recently received packet. Although not depicted in the figure, either a single reception confirmation packet or a plurality of packets including the reception confirmation packet (4) may be transmitted. The reception confirmation packets other than the transmitted part of the reception confirmation packets are removed from the transmission buffer and discarded without waiting for the next transmission opportunity to arise, and are therefore not transmitted to the communication device 100-2. Note that here, for ease of description, an ACK corresponding to a transmission packet (x) is denoted as ACK (x). During TCP communication, however, the ACK may include information relating to the packet to be received next, for example.

Hence, the ACK corresponding to the transmission packet (x) may be ACK (x+1). This applies similarly to the ACKs described hereafter.

In the first embodiment, reception confirmation packets are transmitted in response to some received packets but not all received packets. Hence, the number of transmitted reception confirmation packets can be reduced, and as a result, a reduction in communication speed caused by transmission of the reception confirmation packets (ACKs) can be prevented.

A comparison will now be made with a comparison method in which, every time a predetermined number of TCP packets are received, for example, a single reception confirmation packet indicating reception of the predetermined number of TCP packets is transmitted. In the comparison method, the reception confirmation packet is not able to be transmitted until the predetermined number of TCP packets have been received, and as a result, a reduction in communication speed may occur due to a communication delay in the reception confirmation packet. In the first embodiment, however, a reception confirmation packet is created and stored in the transmission buffer every time a TCP packet is received, and the reception confirmation packet is transmitted when a transmission opportunity arises. According to the first embodiment, therefore, reception confirmation packets can be transmitted asynchronously with TCP packet reception, and therefore a delay in transmission of the reception confirmation packet while waiting to receive a TCP packet does not occur. As a result, the communication speed does not decrease.

Second Embodiment

Next, a second embodiment will be described. This embodiment may be considered as a more specific embodiment of the first embodiment, and it therefore goes without saying that the first embodiment and the second embodiment may be implemented in combination.

In the second embodiment, the communication device 100-1 transmits a packet including the reception confirmation packet relating to the most recently received packet. The communication device 100-2, having received the reception confirmation packet, calculates the number of unreceived reception confirmation packets, and increases an amount of data transmitted in a packet in accordance with the calculated number. Note that the reception confirmation packet will also be referred to as an ACK.

<Example Configuration of Communication System>

Figure 2:
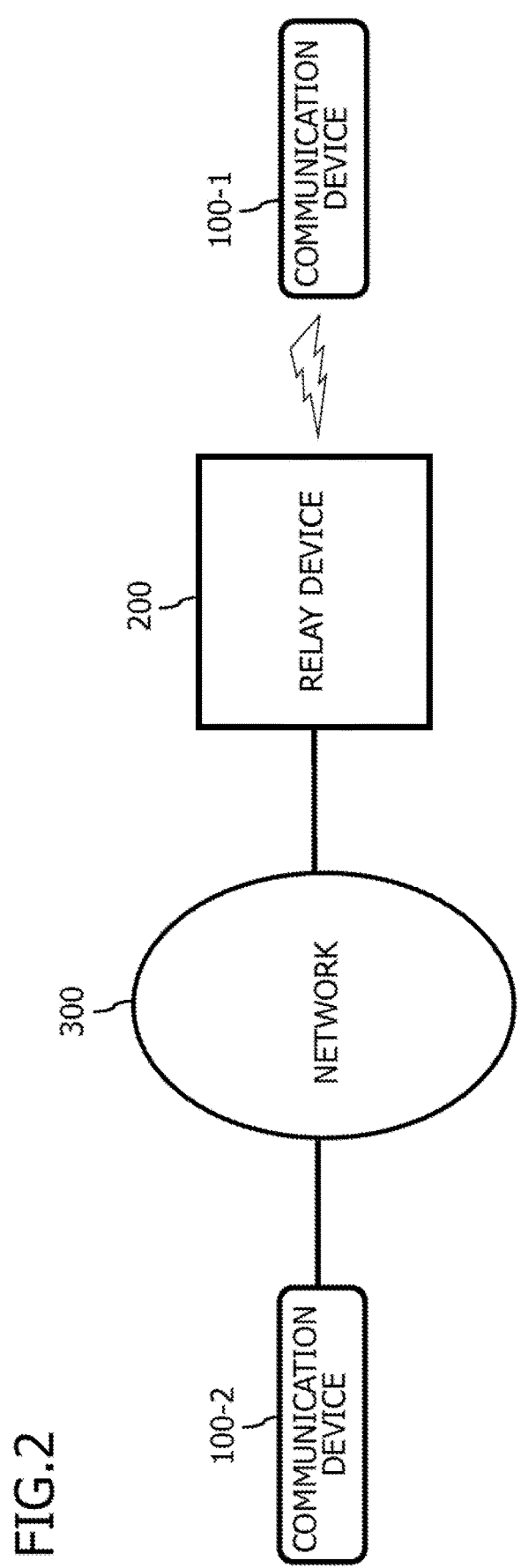
FIG. 2 is a figure depicting an example configuration of the communication system 10.

FIG. 2 is a figure depicting an example configuration of the communication system 10. The communication system 10 includes the communication devices 100-1, 2, a relay device 200, and a network 300. The communication system 10 conforms to LTE communication standards, for example.

The communication device 100 is a portable terminal or a computer, for example. The communication device 100-1 communicates with the communication device 100-2 in order to download data and received provided services from the communication device 100-2, for example. Further, the communication devices 100-1 and 100-2 communicate on the basis of TCP/IP, for example.

The relay device 200 is a packet relay device for relaying packets that are exchanged between the communication devices 100. Note that when the communication device 100 has a function for relaying packets exchanged with the communication device 100, the relay device 200 may be constituted by the communication device 100. In LTE, the relay device 200 is a base station device such as an eNodeB (evolved Node B), for example. The relay device 200 may also be a network device such as a switch or a router.

The network 300 may be the Internet or an intranet constituted by a leased line, for example.

<Example Configuration of Communication Device>

Figure 3:
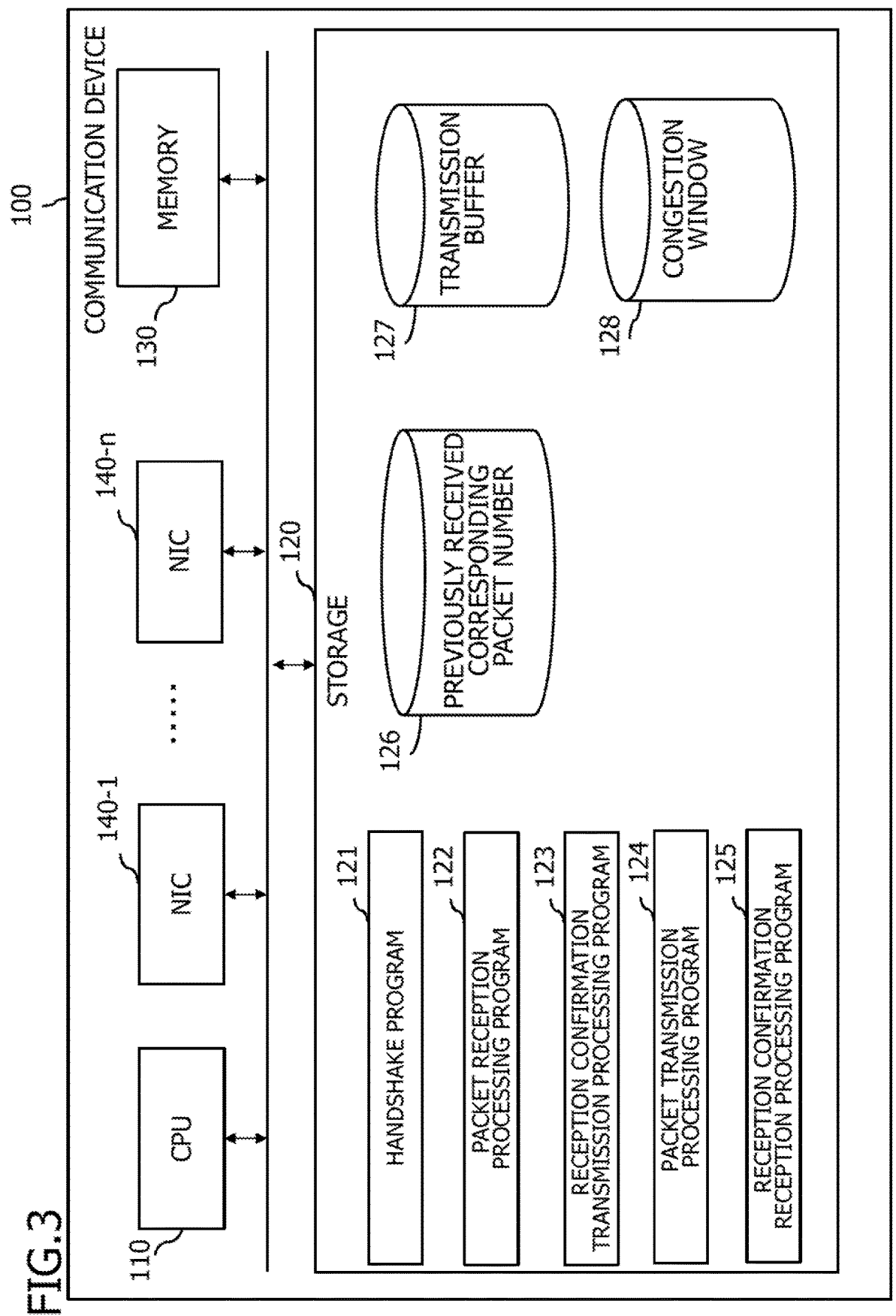
FIG. 3 is a figure depicting an example configuration of the communication device 100.

FIG. 3 is a figure depicting an example configuration of the communication device 100. The communication device 100 includes a CPU (Central Processing Unit) 110, storage 120, a memory 130, and NICs (Network Interface Cards) 140-1 to 140-n.

The storage 120 is an auxiliary storage device for storing programs and data. The storage 120 stores a handshake program 121, a packet reception processing program 122, a reception confirmation transmission processing program 123, a packet transmission processing program 124, a reception confirmation reception processing program 125, a previously received corresponding packet number 126, a transmission buffer 127, and a congestion window 128.

The previously received corresponding packet number 126 stores the corresponding packet number of the ACK received last time. The previously received corresponding packet number 126 is used by the communication device 100 to calculate the corresponding packet number of an unreceived ACK. The communication device 100 updates the previously received corresponding packet number 126 upon reception of an ACK.

The transmission buffer 127 is an area for storing created ACKs. In addition to ACKs, the transmission buffer 127 may store TCP packets. To transmit a packet, the communication device 100 extracts the packet from the transmission buffer 127 and transmits the extracted packet to another communication device. The communication device 100 may include one each of a transmission buffer for transmitting ACKs and a transmission buffer for transmitting TCP packets.

The congestion window 128 is a buffer for adjusting the amount of transmitted data. When the size of the congestion window 128 is expanded, the amount of data transmitted in a packet is increased. Further, the communication device 100 expands the size of the congestion window 128 upon reception of an ACK. Note that the amount of transmitted data refers to a data size of a single packet or the number of packets that can be transmitted by a series of packet transmission processing, for example. The amount of transmitted data also refers to a total size of the data that can be transmitted in one or a plurality of packets during a series of packet transmission processing, for example.

The memory 130 is an area to which the programs stored in the storage 120 are loaded. The memory 130 is also used as an area for storing programs and data.

The NICs 140-1 to 140-n are devices for connecting to and communicating with another communication device either wirelessly or by wire. The NICs 140-1 to 140-n may be connected to the other communication device via a hub or a switch.

The CPU 110 is a processor that realizes respective types of processing by loading a program stored in the storage 120 to the memory 130 and executing the loaded program.

By executing the handshake program 121, the CPU 110 executes session establishment processing for establishing a session in which to transmit a packet to the other communication device. The communication device 100 executes the session establishment processing when a packet is to be transmitted to the other communication device.

Further, by executing the packet reception processing program 122, the CPU 110 constructs a packet receiver (or a controller) in order to execute packet reception processing.

The packet reception processing is processing for receiving a TCP packet from the other communication device. In the packet reception processing, when the TCP packet is received, an ACK corresponding to the received TCP packet is created and stored in the transmission buffer 127.

Furthermore, by executing the reception confirmation transmission processing program 123, the CPU 110 constructs a reception confirmation transmission processor (or a transmitter) in order to execute reception confirmation transmission processing. The reception confirmation transmission processing is processing for transmitting the ACK to the other communication device. In the reception confirmation transmission processing, when a transmission opportunity arises, the ACK relating to the most recently received TCP packet, among the ACKs stored in the transmission buffer 127, is transmitted to the other communication device, and the other ACKs are removed from the transmission buffer and discarded.

Further, by executing the packet transmission processing program 124, the CPU 110 constructs a packet transmitter in order to execute packet transmission processing. The packet transmission processing is processing for transmitting a TCP packet to the other communication device. In the packet transmission processing, when a transmission opportunity arises, a TCP packet stored in the transmission buffer 127 is transmitted to the other communication device.

Furthermore, by executing the reception confirmation reception processing program 125, the CPU 110 constructs a reception confirmation receiver in order to execute reception confirmation reception processing. The reception confirmation reception processing is processing for increasing the amount of data transmitted in a packet upon reception of an ACK from the other communication device. In the reception confirmation reception processing, when the ACK is received, the number of unreceived ACKs is calculated, and the amount of transmitted data is increased in accordance with the calculated number. To increase the amount of transmitted data during the reception confirmation reception processing, the size of the congestion window 128 is expanded.

<Packet Transmission/Reception Processing>

Figure 4:
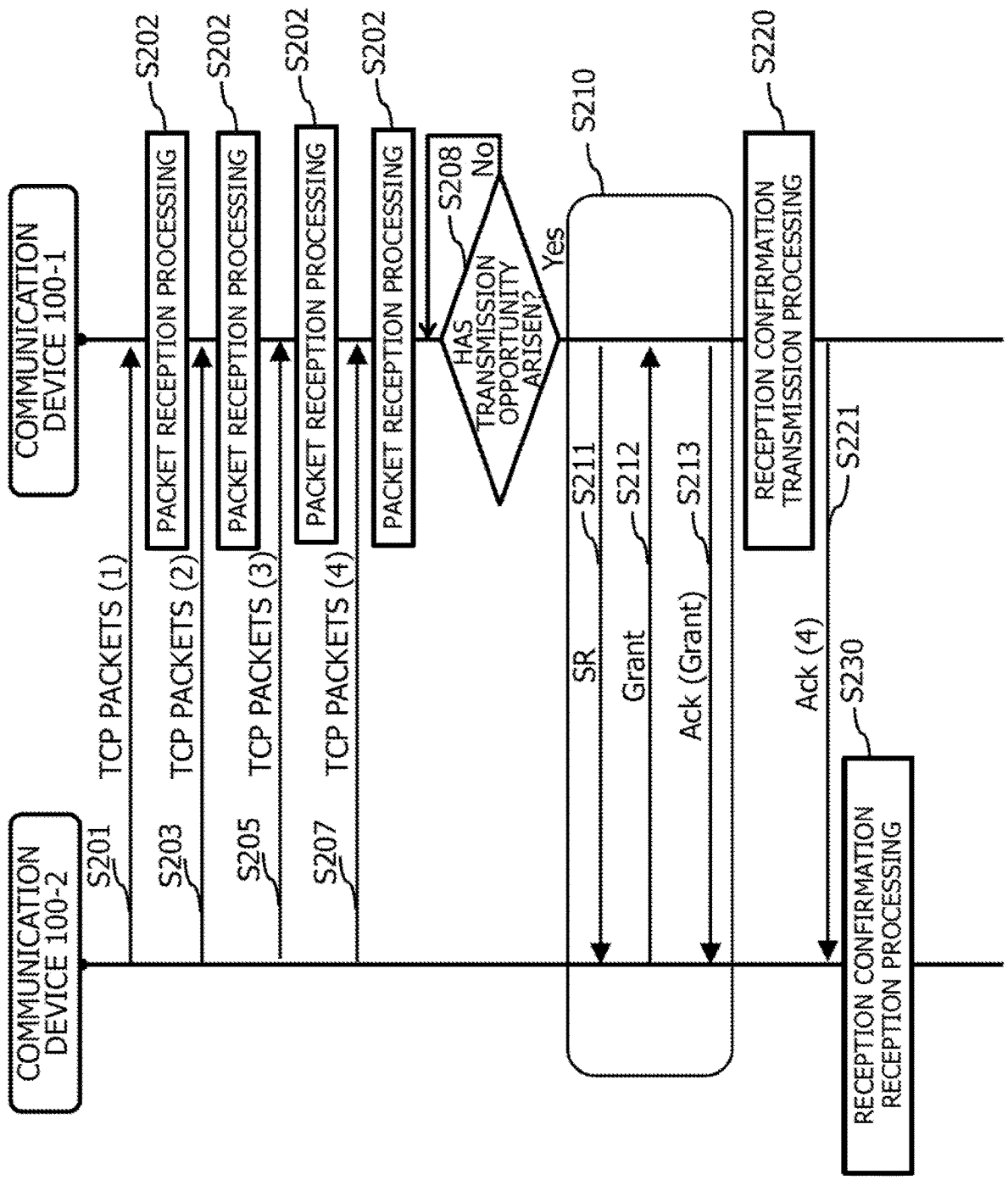
FIG. 4 is a figure depicting an example of a sequence of packet transmission/reception in the communication devices.

FIG. 4 is a figure depicting an example of a sequence of packet transmission/reception in the communication devices. Packet transmission/reception processing executed by the communication devices 100 will be described below using FIG. 4.

The communication device 100-1, upon reception of the TCP packet (1) from the communication device 100-2 (S201), executes packet reception processing (S202).

Figure 5:
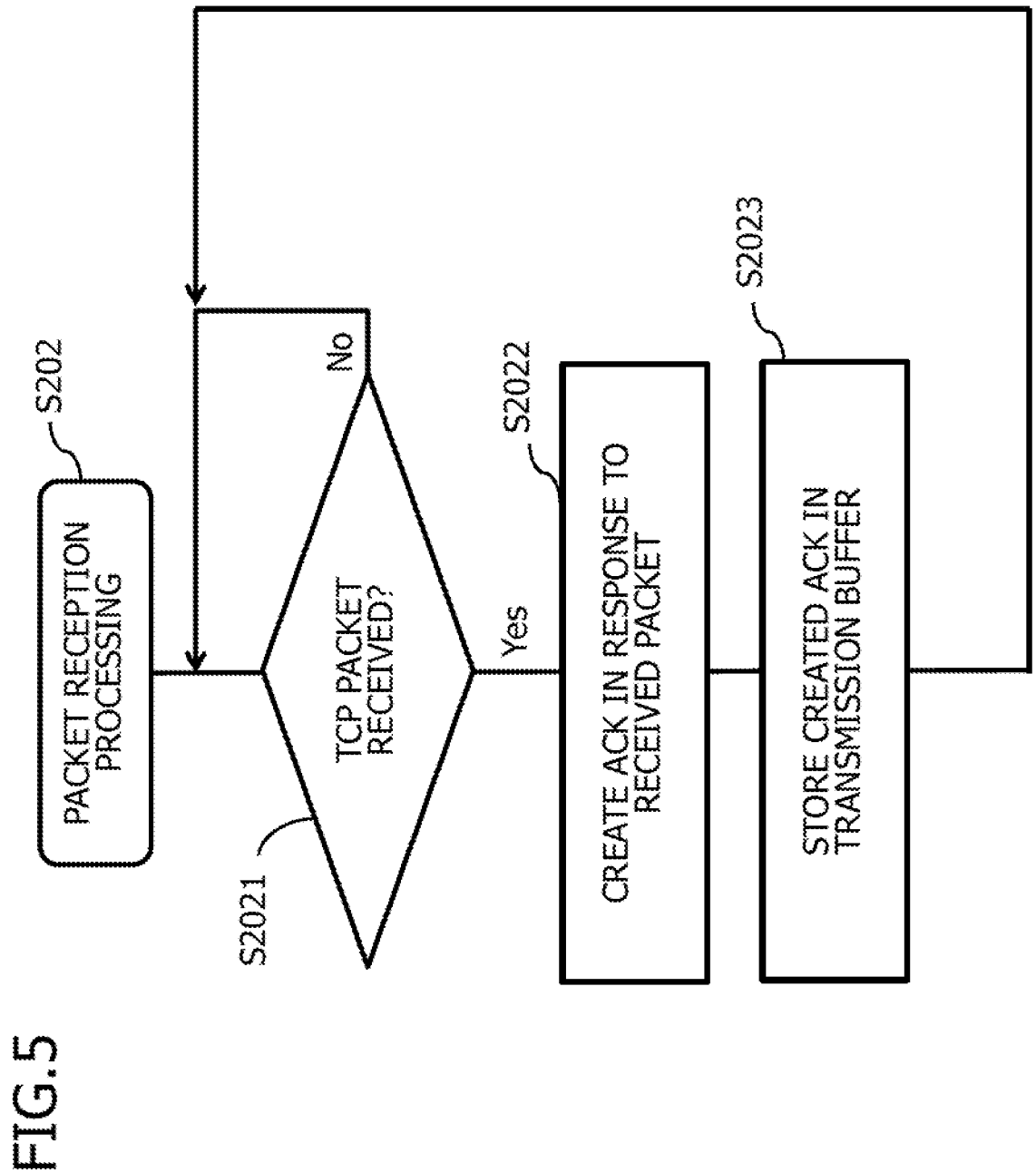
FIG. 5 is a figure depicting an example of a processing flowchart of the packet reception processing.

FIG. 5 is a figure depicting an example of a processing flowchart of the packet reception processing (S202). The communication device 100, upon reception of a TCP packet (Yes in S2021), creates an ACK corresponding to the received TCP packet (S2022). The corresponding packet number included in the received TCP packet is included in the ACK, making it possible to specify the TCP packet to which the created ACK corresponds. In FIG. 5, the communication device 100-1 receives the TCP packet (1) from the communication device 100-2 (S201) and creates the corresponding ACK (1). The communication device 100 then stores the created ACK in the transmission buffer 127 (S2023). In FIG. 5, the communication device 100-1 stores the created ACK (1) in the transmission buffer 127. The communication device 100 creates the ACK at the reception timing of the TCP packet, and stores the created ACK in the transmission buffer so that the created ACK can be transmitted when a transmission opportunity arises asynchronously with TCP packet reception. In so doing, an ACK can be transmitted in response even to a TCP packet received in the past, regardless of the timing at which the transmission opportunity arises. Moreover, the communication device 100 can modify the number of transmitted ACKs depending on conditions when the transmission opportunity arises.

Returning to the sequence in FIG. 4, the communication device 100-1 receives the TCP packet (2) (S203) and executes the packet reception processing (S202). Thereafter, similar processing to the packet reception processing executed upon reception of the TCP packet (1) is executed upon reception of the TCP packet (3) (S205) and upon reception of the TCP packet (4) (S206).

Figure 7:
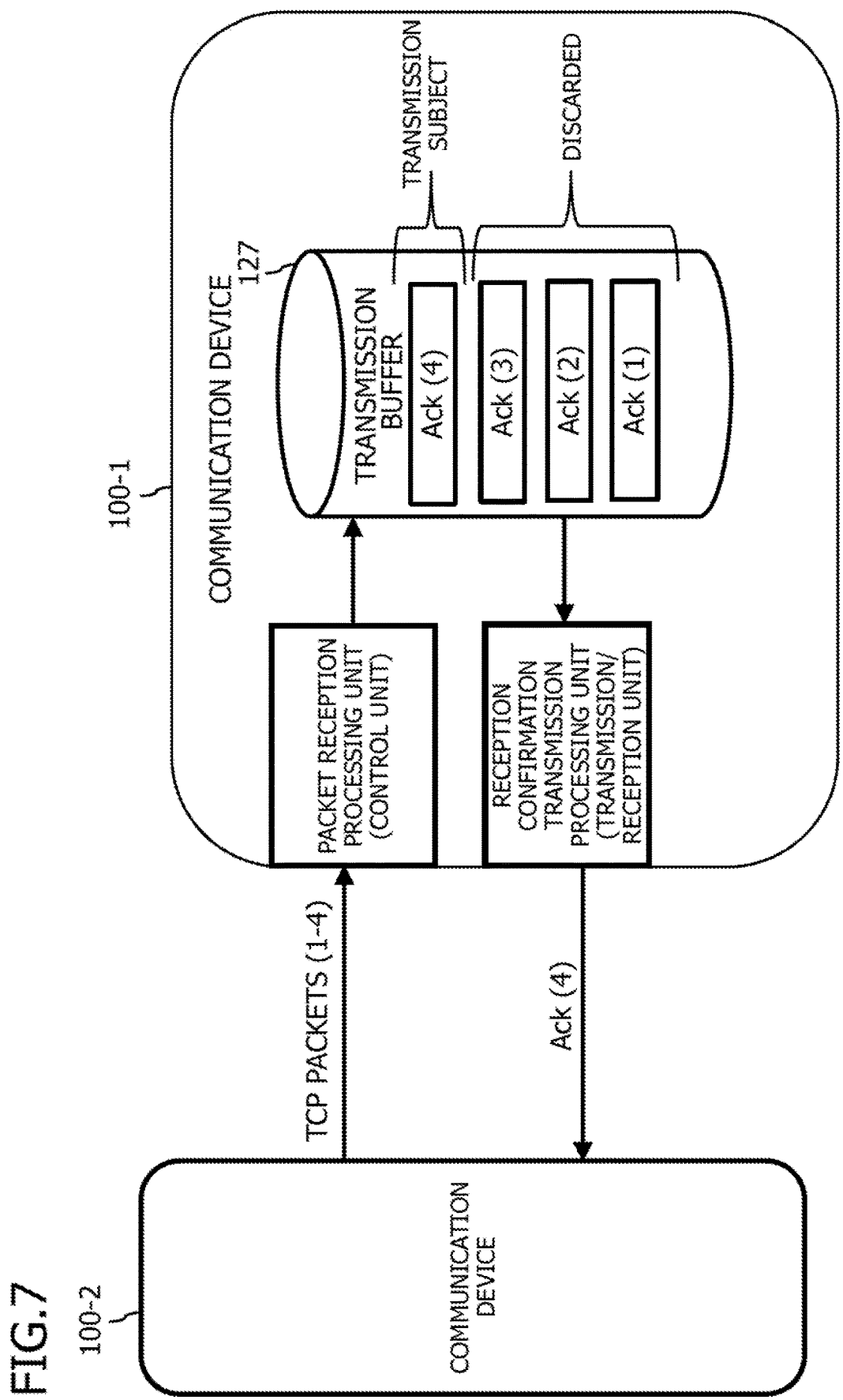
FIG. 7 is a figure depicting an example of the transmission buffer provided in the communication device 100-1.

FIG. 7 is a figure depicting an example of the transmission buffer 127 provided in the communication device 100-1. The communication device 100 stores an ACK in the transmission buffer every time a TCP packet is received so that when the four TCP packets have been received, ACKs (1) to (4) are stored in the transmission buffer 127.

Returning to the sequence in FIG. 4, when a transmission opportunity arises (Yes in S208), the communication device 100 executes session establishment processing (S210) in order to transmit a packet. Transmission opportunities arise when, for example, the packet transmission wait timer times out, packets are stored in the transmission buffer up to a predetermined size, or the base station device (the communication device 200-2, for example) grants uplink transmission permission (UL Grant) to the mobile terminal device (the communication device 200-1, for example). Further, as long as the session establishment processing (S210) is executed before transmitting the packet, the processing does not have to be executed immediately before the packet is transmitted. Moreover, if a session is established when the packet is to be transmitted, the session establishment processing (S210) does not have to be executed.

In the session establishment processing (S210), the communication device 100-1, which is the communication device on the packet transmission side, transmits an SR (Scheduling Request) to the communication device 100-2 (S211). An SR is a message requesting transmission resources, i.e. transmission resources to be used to transmit the packet. Upon reception of the SR, the communication device 100-2 transmits a Grant (S212). A Grant is a message transmitted in response to the request included in the SR, and includes information relating to the transmission resources. The transmission resources are a quota allocated by the communication device 100-2, and include a data amount or a communication speed for transmitting the packet, such as a used frequency and a bandwidth thereof, for example. Upon reception of the Grant, the communication device 100-1 transmits an ACK confirming reception of the Grant or a HARQ (Hybrid Automatic Repeat request) ACK (S213). The HARQ ACK is an ACK relating to a transmitted HARQ process in a Hybrid ARQ system, which is a retransmission control method used in cellular communication. In TCP/IP, for example, the session establishment processing (S210) is a three-way handshake.

The communication device 100-1 then executes reception confirmation transmission processing (S220).

Figure 6:
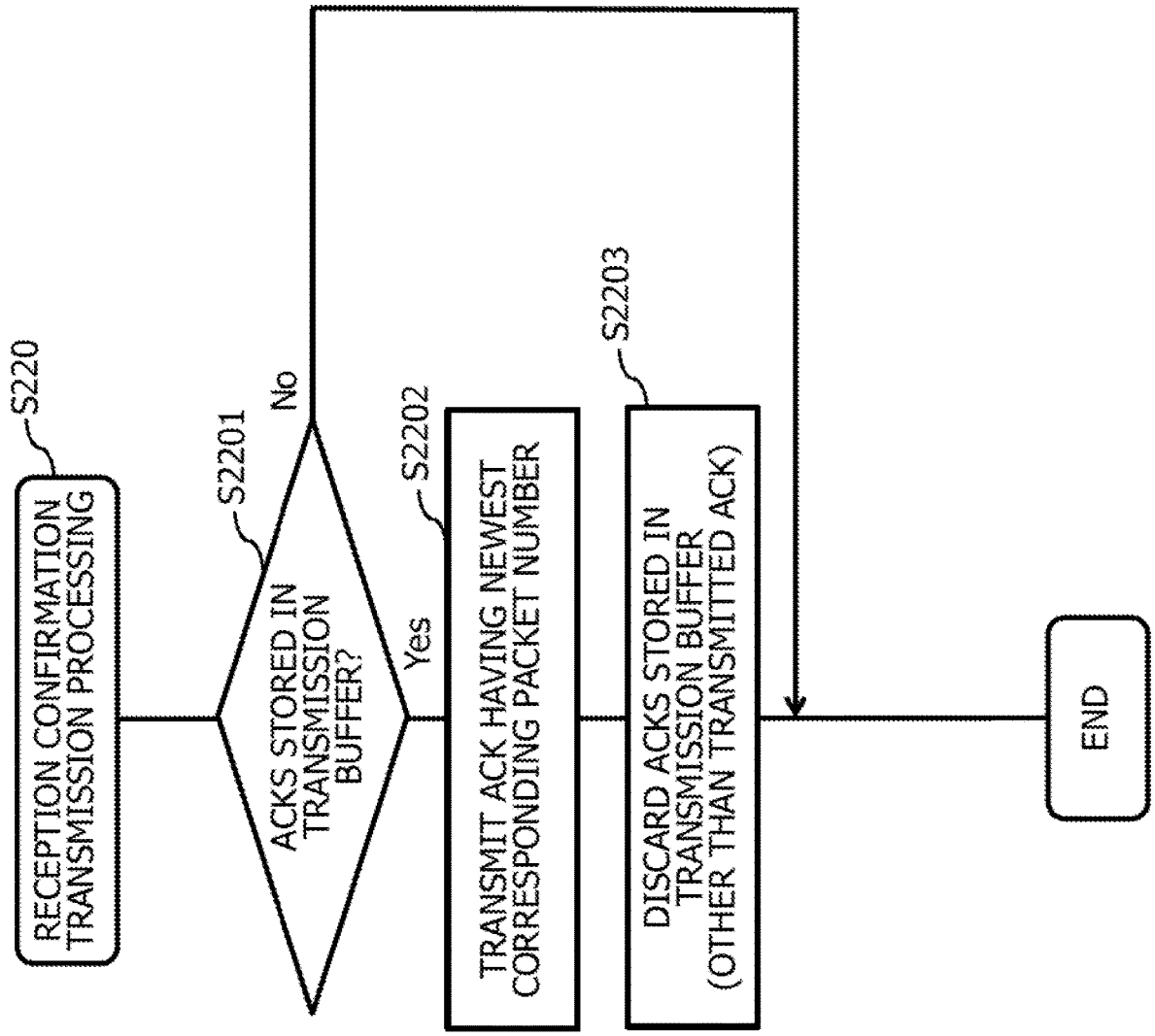
FIG. 6 is a figure depicting an example of a processing flowchart of the reception confirmation transmission processing.

FIG. 6 is a figure depicting an example of a processing flowchart of the reception confirmation transmission processing (S220). The communication device 100-1 checks whether or not any ACKs are stored in the transmission buffer (S2201). When ACKs are stored in the transmission buffer (Yes in S2201), the communication device 100-1 transmits the ACK having the newest corresponding packet number (S2202). The newest corresponding packet number is the largest corresponding packet number, for example, and the corresponding packet number of the most recently received TCP packet. Note that the transmission subject ACKs may be a plurality of ACKs including the ACK corresponding to the most recently received TCP packet.

Further, when the corresponding packet numbers of the ACKs are not consecutive, indicating the possibility that a TCP packet has not been received, the communication device 100 may refrain from transmitting an ACK. In this case, the TCP packets may have been transmitted and received out of order, for example, and therefore the reception confirmation transmission processing (S220) may be executed after waiting to receive the TCP packet having the missing corresponding packet number. In so doing, the communication device that transmits the TCP packet can confirm that a TCP packet transmitted before the TCP packet corresponding to the received ACK has reached the transmission destination communication device.

The communication device 100 then discards the ACKs stored in the transmission buffer other than the transmitted ACK (S2203). As a result, the remaining ACKs are discarded so as not to be transmitted to the transmission destination communication device even when the next transmission opportunity arises.

Returning to the sequence in FIG. 4, in the reception confirmation transmission processing (S220), the communication device 100-1 transmits the ACK (4) corresponding to the most recent TCP packet (4) (S221).

As illustrated in FIG. 7, when the communication device 100-1 executes the reception confirmation transmission processing (S220), the ACKs (1) to (4) are stored in the transmission buffer 127. Hence, the communication device 100-1 transmits the newest ACK (4) and discards the remaining ACKs (1) to (3).

Returning to the sequence in FIG. 4, the communication device 100-2 executes reception confirmation reception processing (S230) upon reception of the ACK (4).

Figure 8:
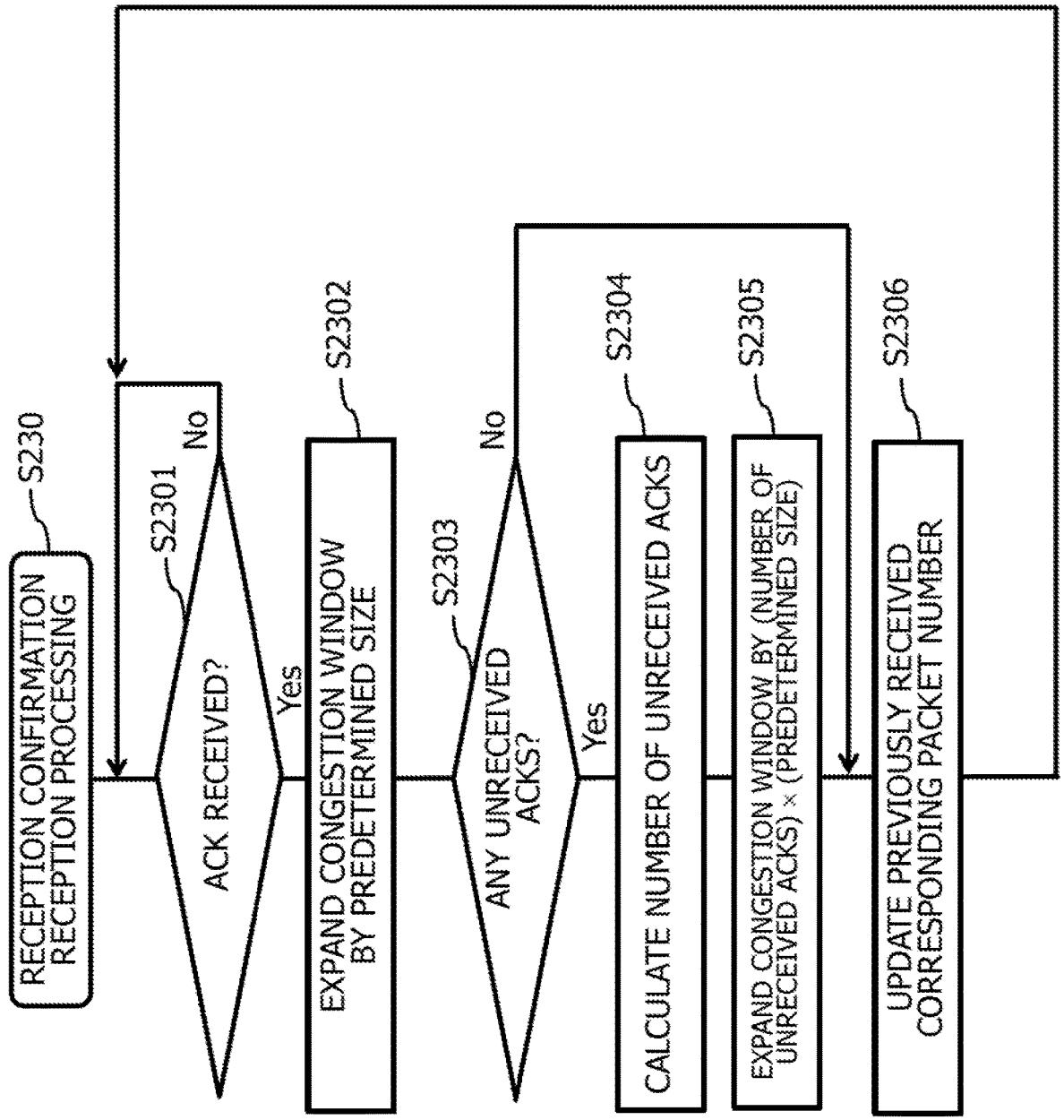
FIG. 8 is a figure depicting an example of a processing flowchart of the reception confirmation reception processing.

FIG. 8 is a figure depicting an example of a processing flowchart of the reception confirmation reception processing (S230). Upon reception of the ACK (Yes in S2301), the communication device 100 expands the congestion window 128 by a predetermined size (S2302). The communication device 100 then determines the amount of data to be transmitted in the transmission subject packet on the basis of the size of the congestion window 128. The size of the congestion window 128 is expanded according to the transmitted data amount of the communication device. The predetermined size is the number of TCP packets that can currently be transmitted, and may take a numerical value corresponding to a characteristic of the communication system, such as a maximum packet size or an average packet size, for example. Further, the predetermined size may be set at a different size every time an ACK is received. Hereafter, a case in which the congestion window is expanded will be described as an example.

Next, the communication device 100 determines whether or not an ACK has not been received (S2303). Whether or not an ACK has not been received is determined from a difference between the corresponding packet number of the ACK received last time, which is stored in the previously received corresponding packet number 126, and the corresponding packet number of the ACK received this time. For example, when the ACK received last time is the ACK (1) and the ACK received this time is the ACK (3), it can be determined that the ACK (2) has not been received.

When an ACK has not been received (Yes in S2303), the number of unreceived ACKs is calculated (S2304), and the congestion window 128 is expanded by a size obtained by multiplying the calculated number by the predetermined size (S2305). During the expansion processing S2302, the congestion window 128 is expanded by the predetermined size relating to a single ACK, whereas in the expansion processing S2305, the congestion window 128 expands to a size corresponding to the number of unreceived ACKs. In so doing, the size of the congestion window 128 can be expanded in accordance with the unreceived ACKs as well as the received ACK, leading to a further increase in the amount of transmitted data. Note that the size of the expansion implemented in the expansion processing S2305 does not have to be a size obtained by multiplying the calculated number by the predetermined size, and instead, for example, the size of the expansion implemented in the expansion processing S2305 may be a numerical value that increases steadily as the number of unreceived packets increases.

The communication device 100 then updates the previously received corresponding packet number (S2306).

In the second embodiment, the ACK corresponding to the most recent packet is transmitted as the part of the ACKs to be transmitted, and the other ACKs are not transmitted. In so doing, the number of transmitted ACKs is reduced, leading to a reduction in the amount of used transmission resources, and as a result, a reduction in communication speed is prevented.

Further, in the second embodiment, the unreceived ACKs are calculated, and the size of the congestion window is expanded in accordance with the unreceived ACKs. In so doing, even when the number of ACKs transmitted by the communication device is reduced, the amount of data transmitted from the communication device on the side that receives the ACK can be increased substantially in proportion with the number of times a TCP packet is transmitted successfully, and as a result, a reduction in communication speed is prevented.

Third Embodiment

Next, a third embodiment will be described. This embodiment may be considered as a more specific embodiment of the first embodiment, and it therefore goes without saying that the first embodiment and the third embodiment may be implemented in combination.

In the third embodiment, the communication device 100-1 varies the number of transmitted reception confirmation packets in accordance with the transmission resources allocated thereto. Further, the communication device 100-2 that receives the reception confirmation packets increases the amount of data transmitted in a packet in accordance with the number of received ACKs.

<Packet Transmission/Reception Processing>

Figure 9:
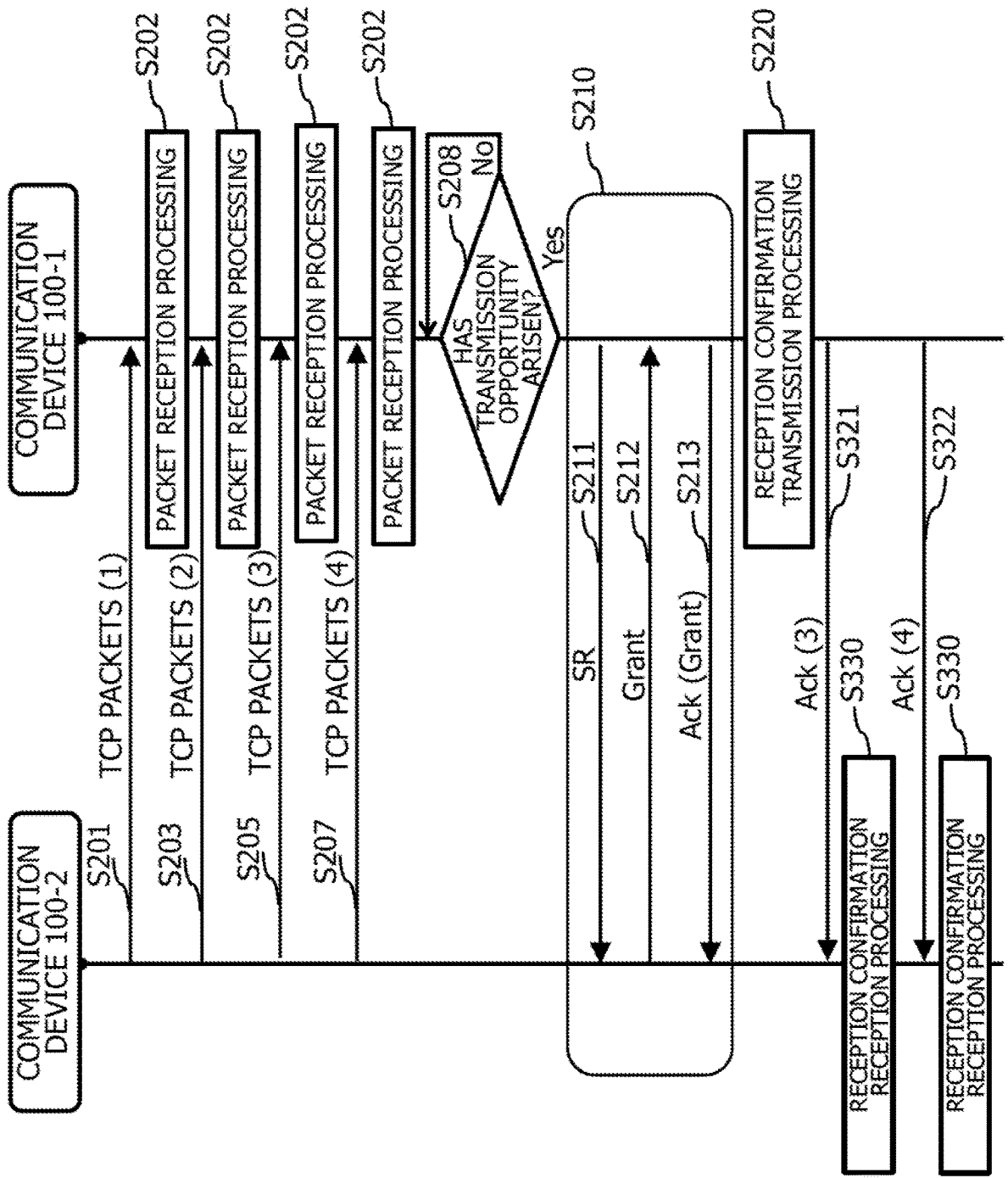
FIG. 9 is a figure depicting an example of a sequence of packet transmission/reception in the communication devices.

FIG. 9 is a figure depicting an example of a sequence of packet transmission/reception in the communication devices. Packet transmission/reception processing executed by the communication devices 100 will be described below using FIG. 9. Note that from transmission of the TCP packet (S201) to the session establishment processing (S210), the processing is similar to the second embodiment.

The communication device 100-1 executes reception confirmation transmission processing (S320).

Figure 10:
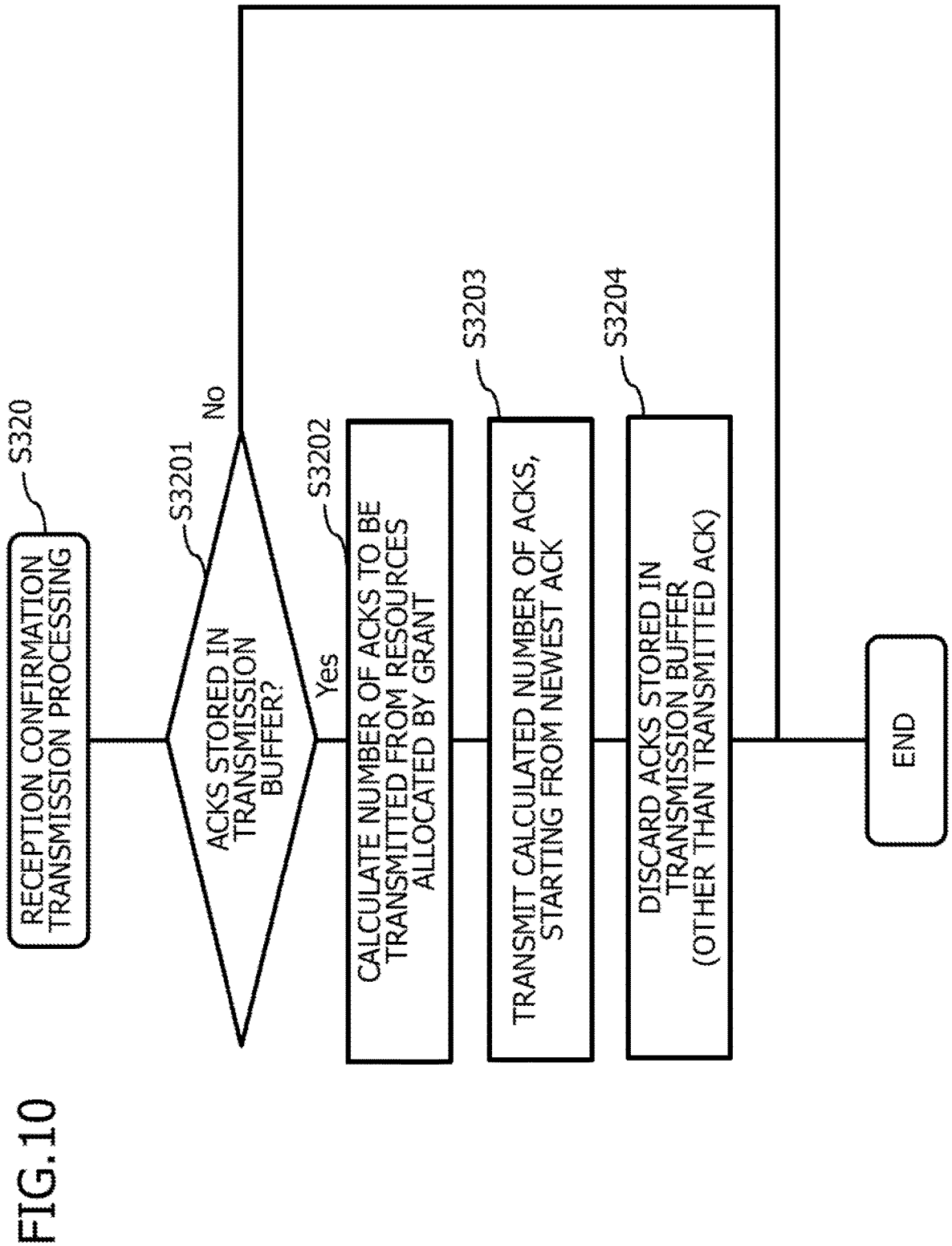
FIG. 10 is a figure depicting an example of a processing flowchart of the reception confirmation transmission processing.

FIG. 10 is a figure depicting an example of a processing flowchart of the reception confirmation transmission processing (S320). When ACKs are stored in the transmission buffer 127 (Yes in S3201), the communication device 100-1 calculates the number of ACKs to be transmitted to the communication device 100-2 from the transmission resources allocated by the Grant (S3202). The number of ACKs to be transmitted is obtained by dividing the allocated transmission resources by the packet size of the ACKs to be transmitted, for example. Alternatively, for example, the number of ACKs to be transmitted may be obtained by dividing the transmission resources excluding the transmission resources used to transmit TCP packets by the packet size of the ACKs. Furthermore, the number of ACKs to be transmitted may be obtained by, for example, determining a plurality of thresholds and numbers of transmitted ACKs corresponding respectively to the thresholds in advance, determining the thresholds between which the transmission resources exist, and setting the number of ACKs to be transmitted in accordance with the respective thresholds. In so doing, the number of ACKs to be transmitted is varied in accordance with the allocated transmission resources.

The communication device 100-1 transmits the calculated number of ACKs, starting from the newest ACK (S3203). When a plurality of ACKs are transmitted, the communication device 100-1 may transmit any ACKs as the ACKs that are transmitted in addition to the newest ACK. For example, a case in which two ACKs are transmitted will be described. When the ACKs (1) to (4) are stored in the transmission buffer 127, the newest ACK (4) and the next newest ACK (3) may be transmitted, or the newest ACK (4) and the oldest ACK (1) may be transmitted.

The communication device 100-1 then discards the ACKs stored in the transmission buffer 127 other than the transmitted ACKs (S3204).

Returning to the sequence in FIG. 9, during the reception confirmation transmission processing (S320), the communication device 100-1 transmits the ACK (3) (S321) and then the ACK (4) (S322).

Figure 11:
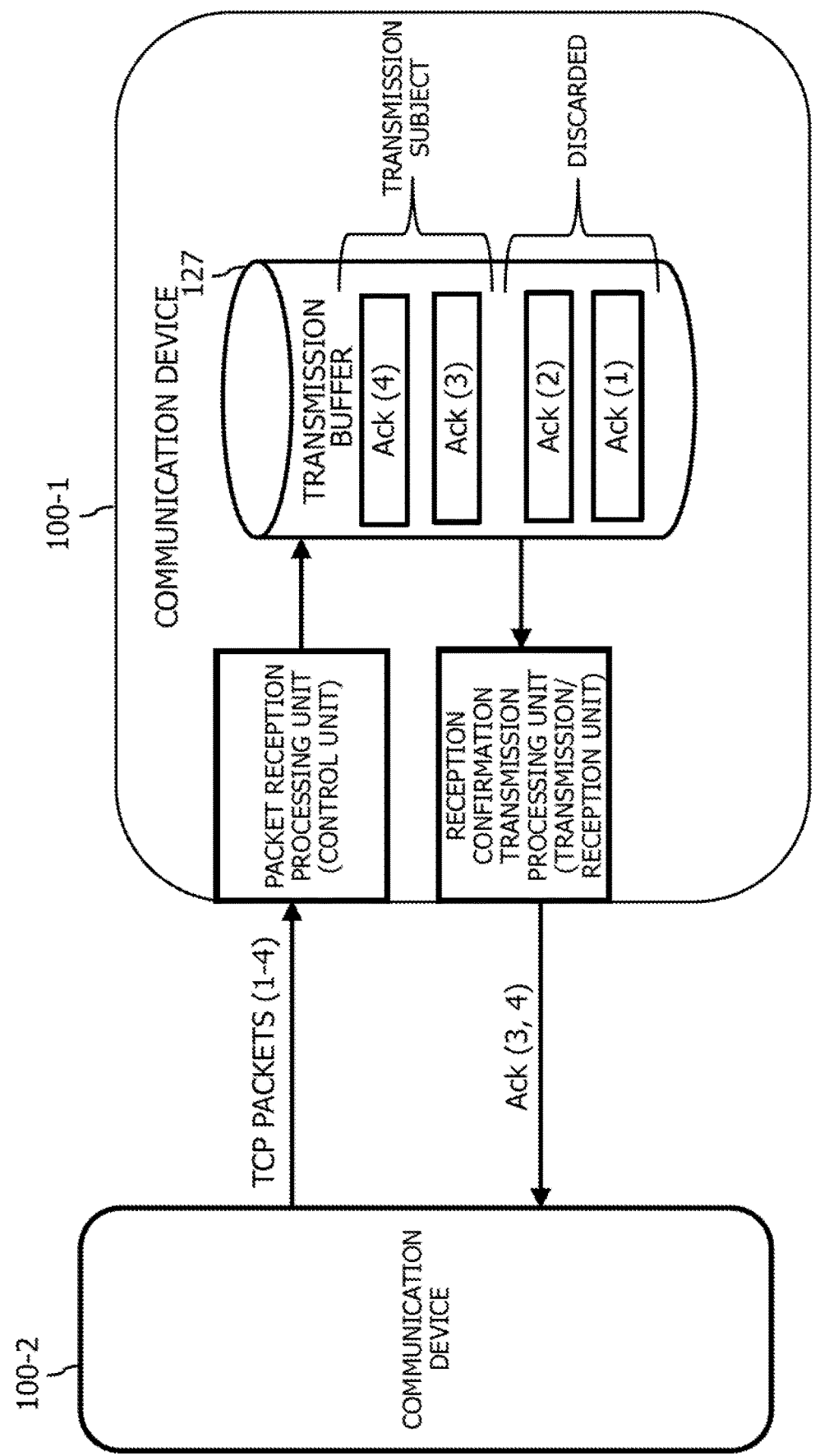
FIG. 11 is a figure depicting an example of the transmission buffer of the communication device 100-1.

FIG. 11 is a figure depicting an example of the transmission buffer 127 of the communication device 100-1. The communication device 100 stores an ACK in the transmission buffer every time a TCP packet is received so that when four TCP packets have been received, the ACKs (1) to (4) are stored in the transmission buffer 127. During the reception confirmation transmission processing (S320), the communication device 100-1 transmits the newest ACK (4) and the next newest ACK (3) to the newest ACK, and discards the other ACKs (1) and (2).

Returning to the sequence in FIG. 9, the communication device 100-2 executes reception confirmation reception processing (S330) upon reception of the ACKs (3) and (4).

Figure 12:
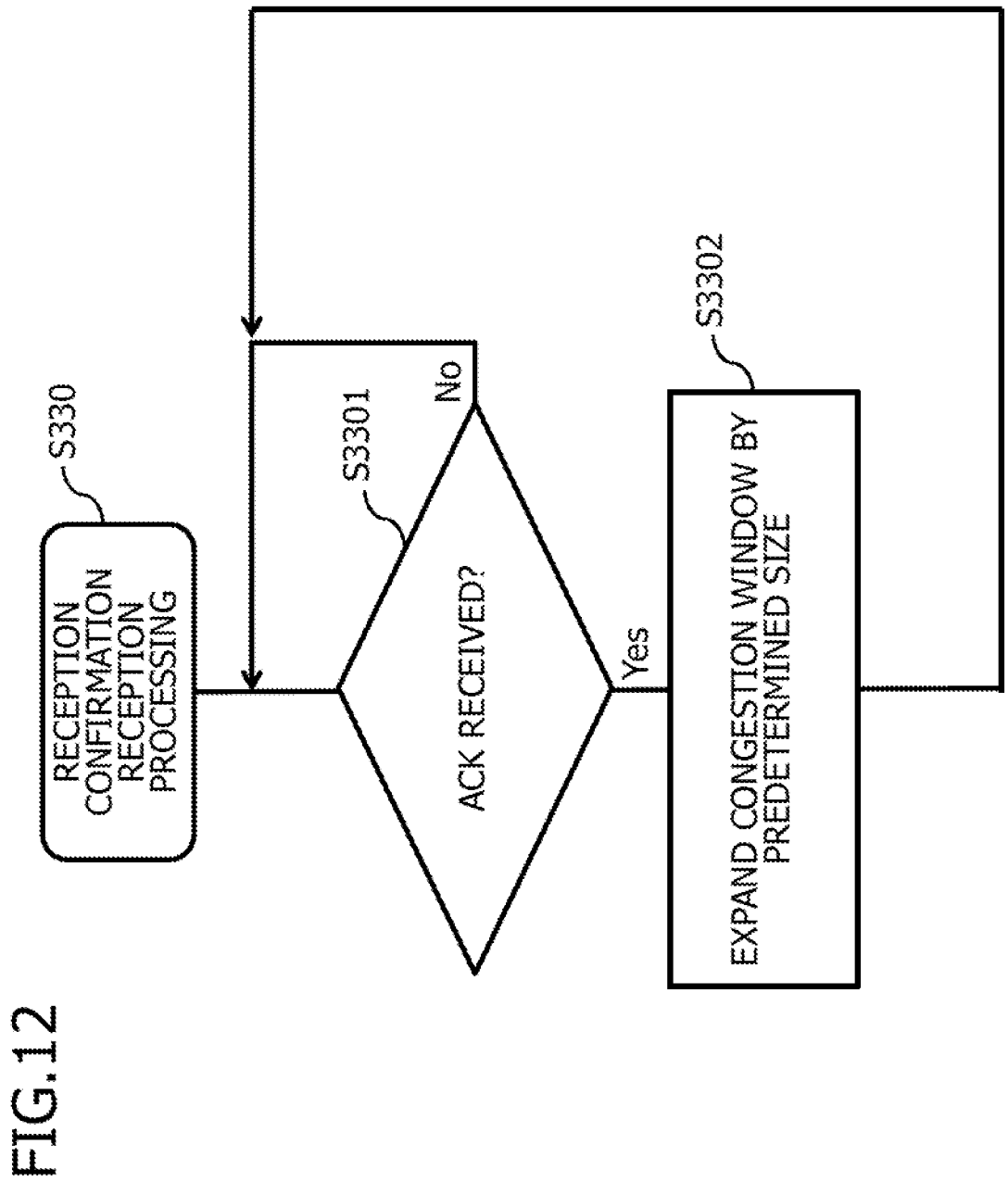
FIG. 12 is a figure depicting an example of a processing flowchart of the reception confirmation reception processing.

FIG. 12 is a figure depicting an example of a processing flowchart of the reception confirmation reception processing (S330). The communication device 100-2, upon reception of an ACK (Yes in S3301), expands the congestion window by the predetermined size (S3302). By expanding the size of the congestion window, the amount of data transmitted in a packet is increased. By executing the reception confirmation reception processing every time an ACK is received, the communication device 100-2 expands the size of the congestion window, thereby increasing the amount of data transmitted in a packet, in accordance with the number of received ACKs.

In the third embodiment, a number of ACKs corresponding to the transmission resources is transmitted as the part of the ACKs to be transmitted, and the other ACKs are not transmitted. Hence, under conditions where transmission sources are limited, the number of ACKs to be transmitted is reduced, leading to a reduction in the amount of transmission resources used for ACK transmission, and as a result, a reduction in communication speed is prevented.

Further, when processing is executed to increase the amount of transmitted data in accordance with the number of received ACKs, as in the reception side communication device according to the third embodiment, the amount of transmitted data can be increased by transmitting as many ACKs as possible. In the third embodiment, when the transmission resources are large, or in other words when there is room available in the transmission resources, the number of transmitted ACKs can be increased, leading to an increase in the transmitted data amount of the communication device on the ACK reception side, and as a result, the communication speed can be increased.

Fourth Embodiment

Next, a fourth embodiment will be described.

In the fourth embodiment, the relay device 200 relays the packets that are exchanged between the communication device 100-1 and the communication device 100-2. The relay device 200 estimates/calculates the corresponding packet number of a reception confirmation packet that is not transmitted from the communication device 100-1 to the communication device 100-2 on the basis of the corresponding packet number of a relayed reception confirmation packet. The relay device 200 then creates a reception confirmation packet corresponding to the packet having the calculated corresponding packet number, and transmits the created reception confirmation packet to the communication device 100-2. In other words, the relay device 200 implements substitute transmission of the reception confirmation packet.

Note that in the fourth embodiment, a case in which the relay device 200 relays a packet will be described as an example, but the relay device 200 may be constituted by the communication device 100 capable of executing packet relay processing.

<Example Configuration of Relay Device>

Figure 13:
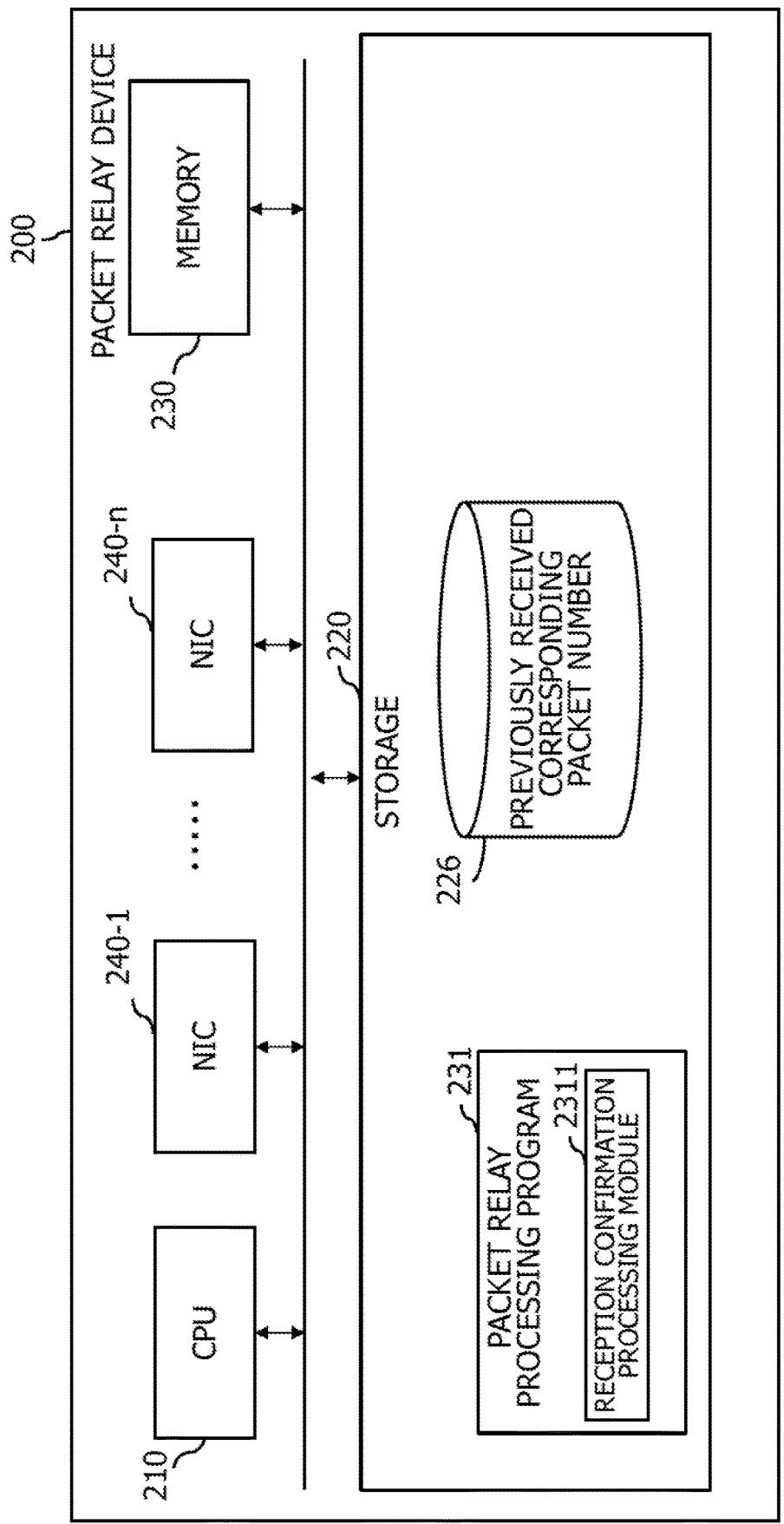
FIG. 13 is a figure depicting an example configuration of the relay device 200.

FIG. 13 is a figure depicting an example configuration of the relay device 200.

The relay device 200 includes a CPU 210, storage 220, a memory 230, and NICs 240-1 to 240-n. The relay device 200 is a packet relay device that relays packets exchanged between communication devices.

The storage 220 is an auxiliary storage device for storing programs and data. The storage 220 stores a packet relay processing program 231 and a previously received corresponding packet number 226.

The previously received corresponding packet number 226 stores the corresponding packet number of the ACK received last time. The previously received corresponding packet number 226 is used to calculate the corresponding packet numbers of unreceived ACKs. The relay device 200 updates the previously received corresponding packet number 226 upon reception of an ACK.

The CPU 210 is a processor that realizes respective types of processing by loading a program stored in the storage 220 to the memory 230 and executing the loaded program.

By executing the packet relay processing program 231, the CPU 210 constructs a packet repeater in order to execute packet relay processing. The packet relay processing is processing for transmitting a packet received from another communication device to a transmission destination communication device.

Further, by executing a reception confirmation processing module 2311 included in the packet relay processing program 231, the CPU 210 constructs a reception confirmation processor in order to execute reception confirmation processing. The reception confirmation processing is processing executed when an ACK is received. The relay device calculates the corresponding packet number of a reception confirmation packet that has not been transmitted, creates an ACK having the calculated corresponding packet number, and transmits the created ACK.

The memory 230 and the NICs 240-1 to 240-n are similar to the memory 130 and the NICs 140-1 to 140-n of the communication device according to the second embodiment.

<Example Configuration of Communication Device>

Figure 14:
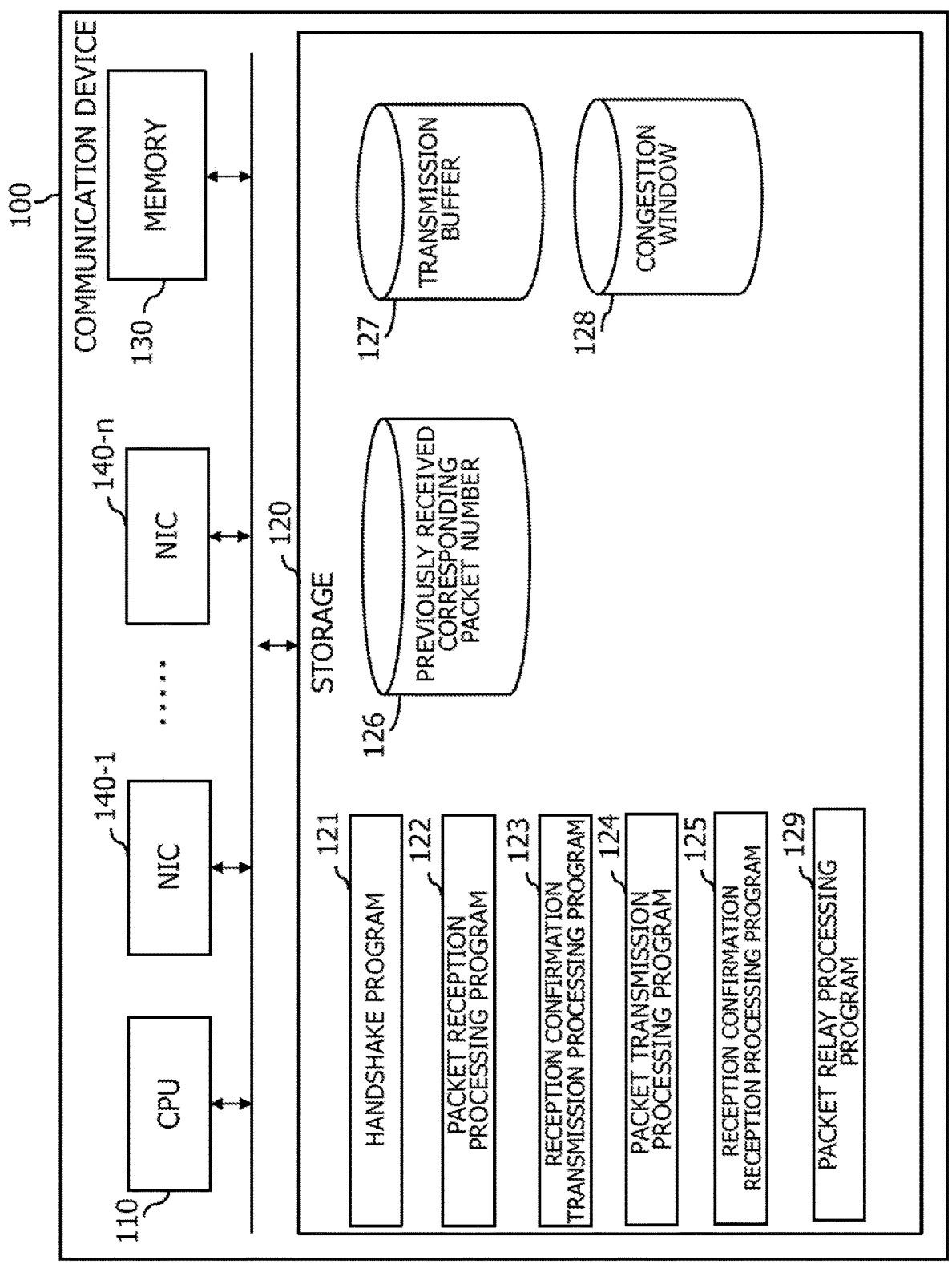
FIG. 14 is a figure depicting an example configuration of the communication device 100.

FIG. 14 is a figure depicting an example configuration of the communication device 100. The communication device 100 is configured as illustrated in FIG. 14 when a packet repeater is included therein.

In the communication device 100, the storage 120 further includes a packet relay processing program 129.

By executing the packet relay processing program 129, the CPU 110 constructs the packet repeater in order to execute the packet relay processing. The packet relay processing is processing for transmitting a packet received from another communication device to the transmission destination communication device. Further, when an ACK is received during the packet relay processing, the corresponding packet number of a reception confirmation packet that has not been transmitted is calculated, an ACK having the calculated corresponding packet number is created, and the created ACK is transmitted.

<Packet Relay Processing>

Figure 15:
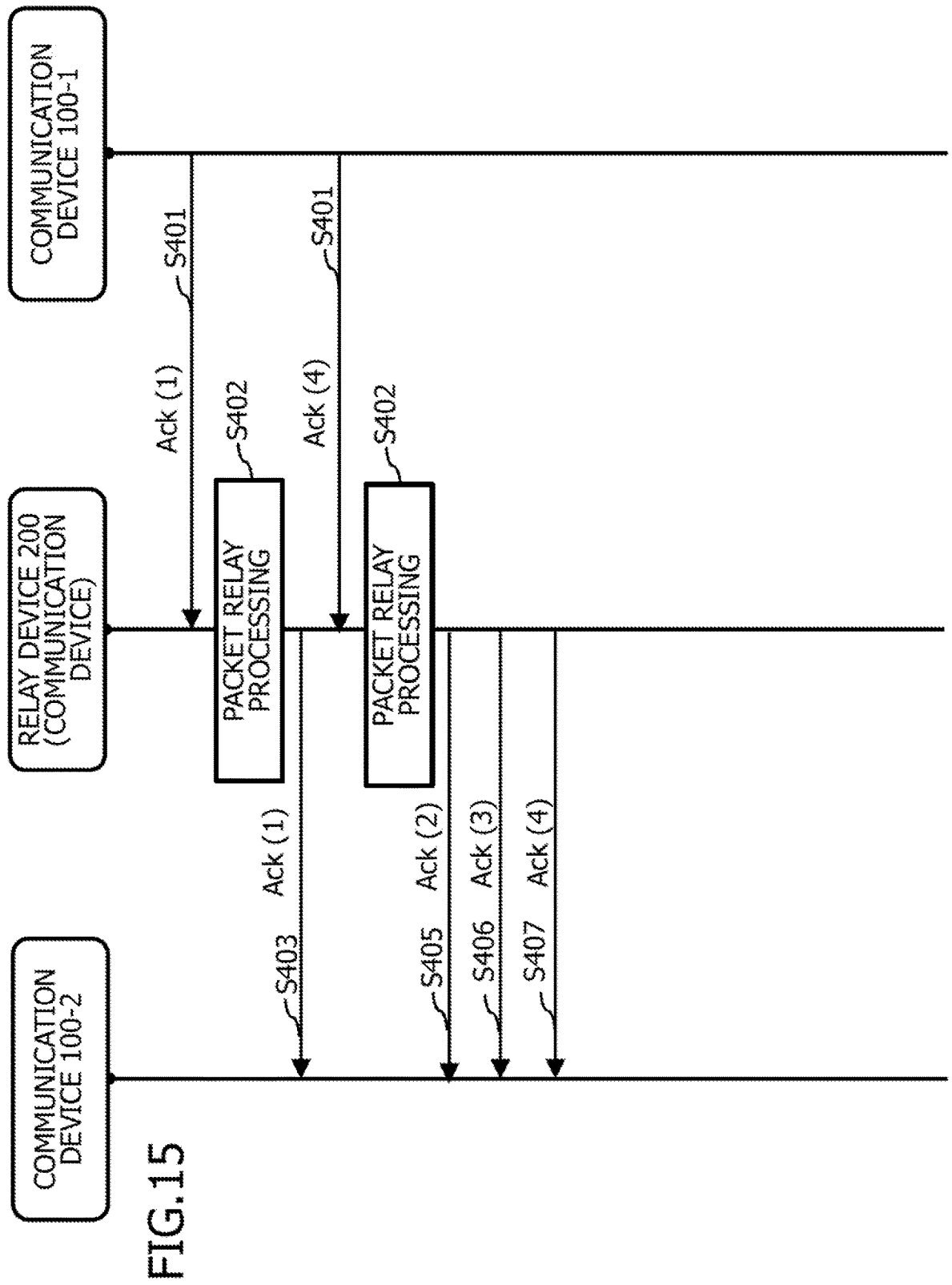
FIG. 15 is a figure illustrating an example of a sequence of the packet relay processing executed by the relay device 200.

FIG. 15 is a figure illustrating an example of a sequence of the packet relay processing executed by the relay device 200. Processing executed in a case where the relay device 200 relays the ACK (1) and the ACK (4) from the communication device 100-1 will be described below.

When the relay device 200 receives the ACK (1) from the communication device 100-1 (S401), the relay device 200 executes packet relay processing (S402).

Figure 16:
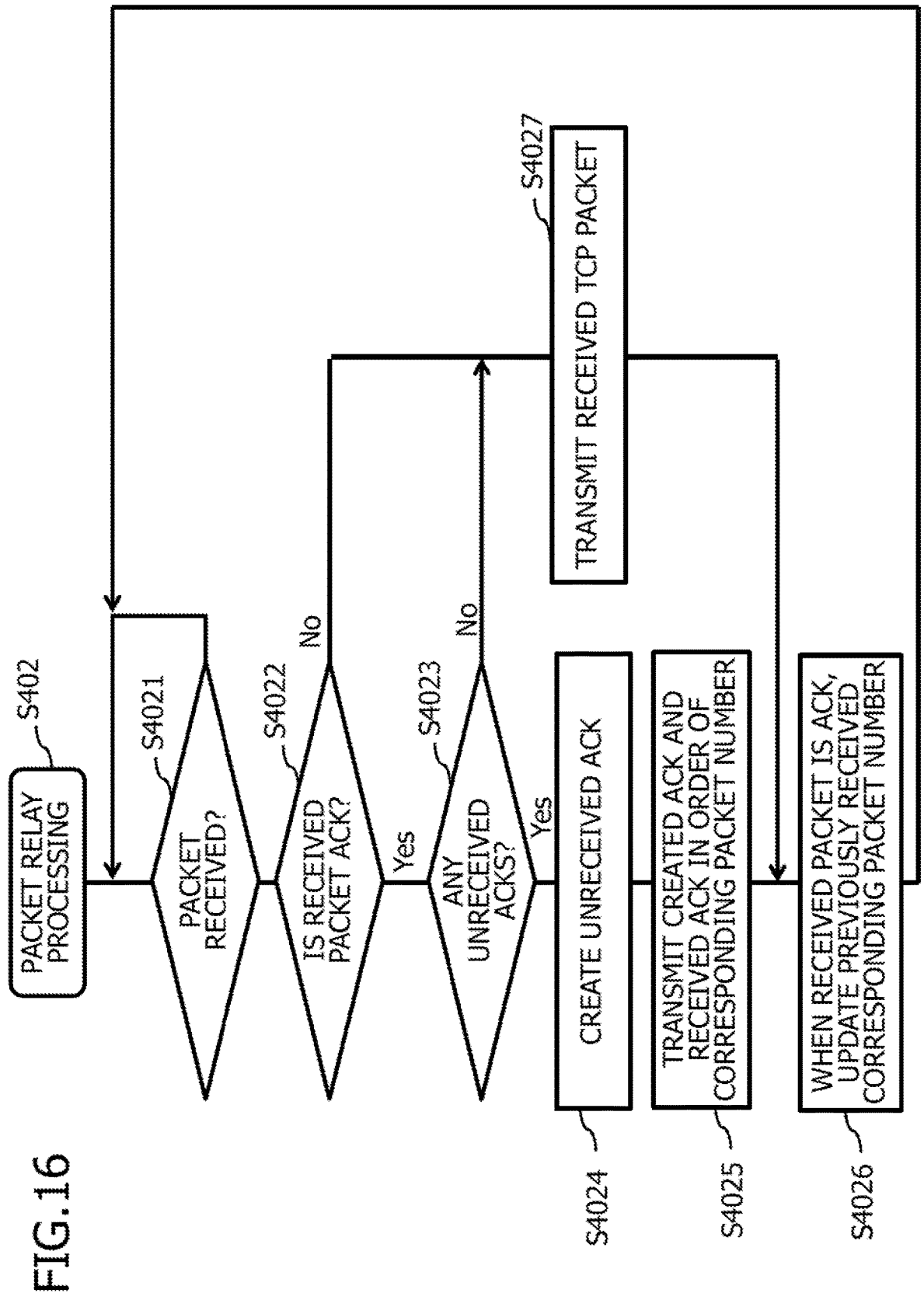
FIG. 16 is a figure illustrating an example of a processing flowchart of the packet relay processing.

FIG. 16 is a figure illustrating an example of a processing flowchart of the packet relay processing (S402). Upon reception of a packet (Yes in S4021), the relay device 200 checks whether or not the received packet is an ACK (S4022). When the received packet is an ACK (Yes in S4022), the relay device 200 determines whether or not an ACK has not been received (S4023).

Whether or not an ACK has not been received is determined from the difference between the corresponding packet number of the ACK received last time, which is stored in the previously received corresponding packet number 226, and the corresponding packet number of the ACK received this time. For example, when the ACK received last time is the ACK (1) and the ACK received this time is the ACK (3), it can be determined that the ACK (2) has not been received. Alternatively, the relay device 200 may determine whether or not an ACK has not been received by storing a corresponding sequence number of a relayed TCP packet in an internal memory and determining whether or not an ACK having the stored corresponding sequence number of the TCP packet has been received.

When an ACK has not been received (Yes in S4023), the unreceived ACK is created (S4024). The unreceived ACK is created by, for example, generating a copy of a received ACK and changing the corresponding packet number thereof. The created ACK and the received ACK are then transmitted in order of the corresponding packet numbers (S4025).

When the received packet is not an ACK (No in S4022) and there are no unreceived ACKs (No in S4023), the received packet is transmitted to the transmission destination communication device (S4027).

When the received packet is an ACK, the relay device 200 updates the previously received corresponding packet number (S4026) and then shifts to packet reception standby.

Returning to the sequence in FIG. 15, after receiving the ACK (1), the relay device 200 determines that there are no unreceived ACKs, and transmits the ACK (1) to the communication device 100-2 (S403). Upon reception of the ACK (4) (S404), the relay device 200 determines during the packet relay processing (S402) that the ACK (2) and the ACK (3) have not been received, and therefore creates the ACK (2) and the ACK (3). The relay device 200 then transmits the received ACK (4) and the created ACKs (2) and (3) to the communication device 100-2 in order of the corresponding packet numbers (S405 to S407).

In the fourth embodiment, the relay device (or the communication device) that relays communications between the communication devices creates an unreceived ACK and transmits the created ACK to the transmission destination communication device. The transmission destination communication device may increase the amount of transmitted data in accordance with the number of received ACKs, similarly to the reception confirmation reception processing according to the third embodiment, for example. Likewise in this case, by transmitting the unreceived ACK to the transmission destination communication device, the amount of transmitted data can be increased, and as a result, the communication speed can be increased.

For example, a case may exist in which the communication device that transmits the ACKs and the relay device communicate with each other wirelessly such that communication resources are limited while the communication device that receives the ACKs and the relay device communicate with each other by wire so that communication resources are large. In this case, according to the fourth embodiment, the number of ACKs transmitted in the section having limited communication resources can be reduced, and the number of ACKs transmitted in the section having large communication resources can be increased. As a result, an increase in the overall communication speed of the communication system can be achieved.

Fifth Embodiment

Next, a fifth embodiment will be described.

In the fifth embodiment, when the reception confirmation processing according to the first to third embodiments is executed, the communication device sets a bearer that is different to that of another TCP session independently in a TCP session to which an ACK to be transmitted belongs. The bearer is a transmission path for transmitting a TCP packet, for example.

<Bearers in LTE>

Figure 17:
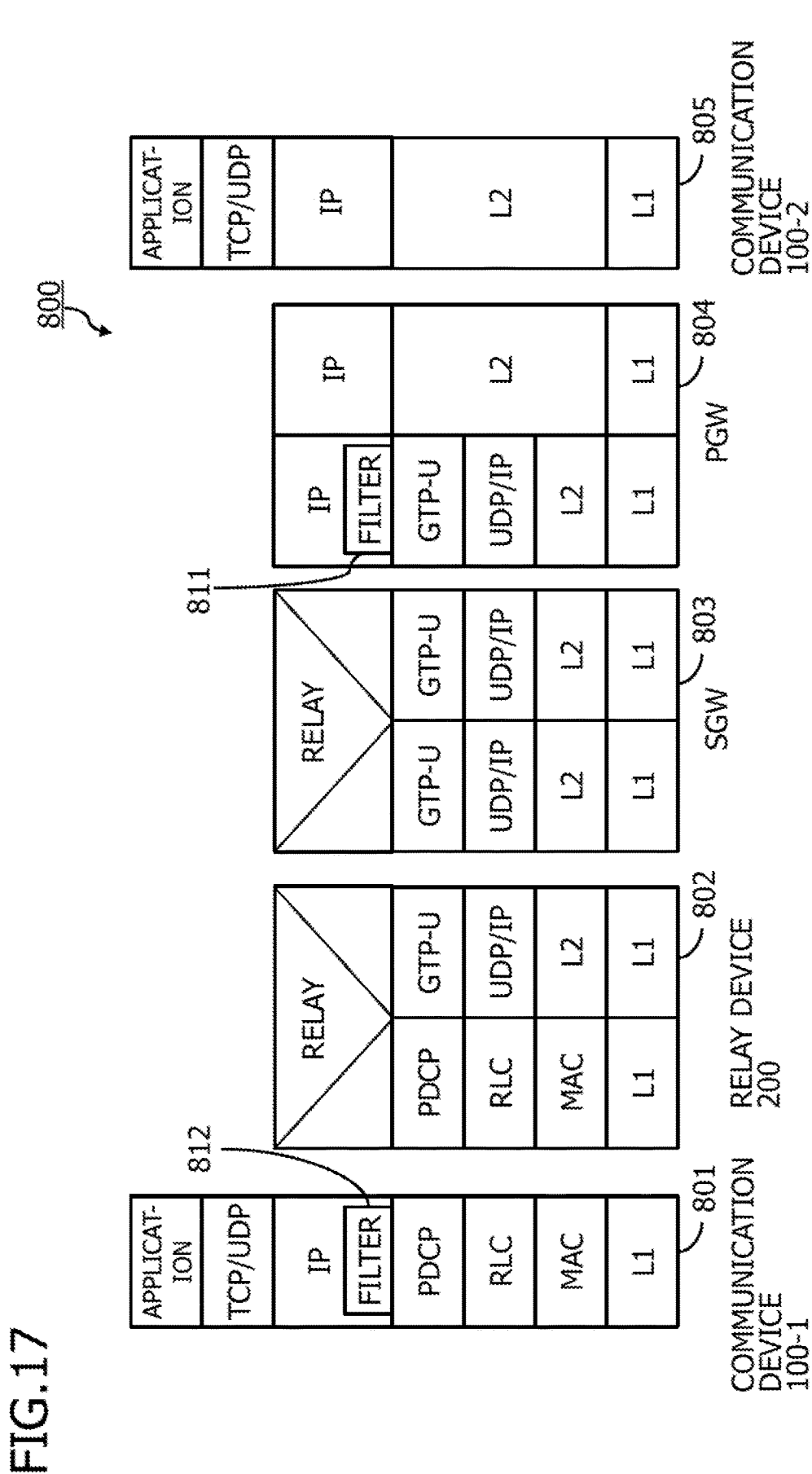
FIG. 17 is a figure depicting an example of a protocol stack in a communication system.

FIG. 17 is a figure depicting an example of a protocol stack in a communication system. The communication system 10 is an LTE communication system, for example, and the relay device 200 is an eNB, i.e. an LTE base station device.

A protocol stack 800 illustrated in FIG. 17, for example, can be applied to the communication system 10. The protocol stack 800 is an LTE-A protocol stack as defined by the 3GPP. Layer groups 801 to 805 are groups respectively indicating processing executed by the communication device 100-1, the relay device 200, an SGW (Serving Gateway) not depicted in the figure, a PGW (Packet data network Gateway) not depicted in the figure, and the communication device 100-2.

In the communication system 10, each device transmits packets using an IP protocol (referred to hereafter as an IP flow). In the communication system 10, IP flow filtering is implemented so that each IP flow is handled in accordance with a QoS (Quality of Service) class. For example, with respect to a downlink on which the communication device 100-1 receives IP flows, the PGW executes packet filtering on the IP flows so as to classify each IP flow into an EPS (Evolved Packet System) bearer. An EPS bearer is an IP flow in an Evolved Packet System.

With respect to an uplink on which the communication device 100-1 transmits IP flows, the PGW notifies the communication device 100-1 of a packet filtering rule. The communication device 100-1 then executes packet filtering on the IP flows on the basis of the filtering rule received from the PGW so as to classify each IP flow into an EPS bearer.

For example, on the uplink, the PGW executes IP flow filtering using a filter layer 811 (Filter) included in an IP layer (IP) within the layer group 804 of the PGW. Further, on the downlink, the communication device 100-1 executes IP flow filtering using a filter layer 812 (Filter) included in an IP layer (IP) within the layer group 801 of the communication device 100-1.

Furthermore, to allow a router (not depicted) provided in the communication system 10 to execute QoS control (or QoS management), the PGW (in the case of a downlink) or the communication device 100-1 (in the case of an uplink) sets a QoS value in a ToS (Type of Service) field of a header of an IP packet.

The packet filtering executed by the PGW or the communication device 100-1 is performed using, for example, a 5-tuple (transmission/reception source IP addresses, transmission/reception source port numbers, and the protocol type). The filtering rule of the packet filtering is known as a TFT (Traffic Flow Template), for example. Note that the EPS bearers may include EPS bearers not having a set TFT.

When IP flow filtering is implemented using a TFT, the IP flows can be classified into a maximum of 11 types of EPS bearers. One of the EPS bearers is referred to as a default bearer. The default bearer is generated when the PGW allocates an IP address to the communication device 100-1, and exists at all times until the IP address allocated to the communication device 100-1 is released. The EPS bearers other than the default bearer are referred to as dedicated bearers. The dedicated bearers can be generated and released as appropriate in accordance with the conditions of user data to be transmitted.

<Bearer Setting Processing>

Figure 18:
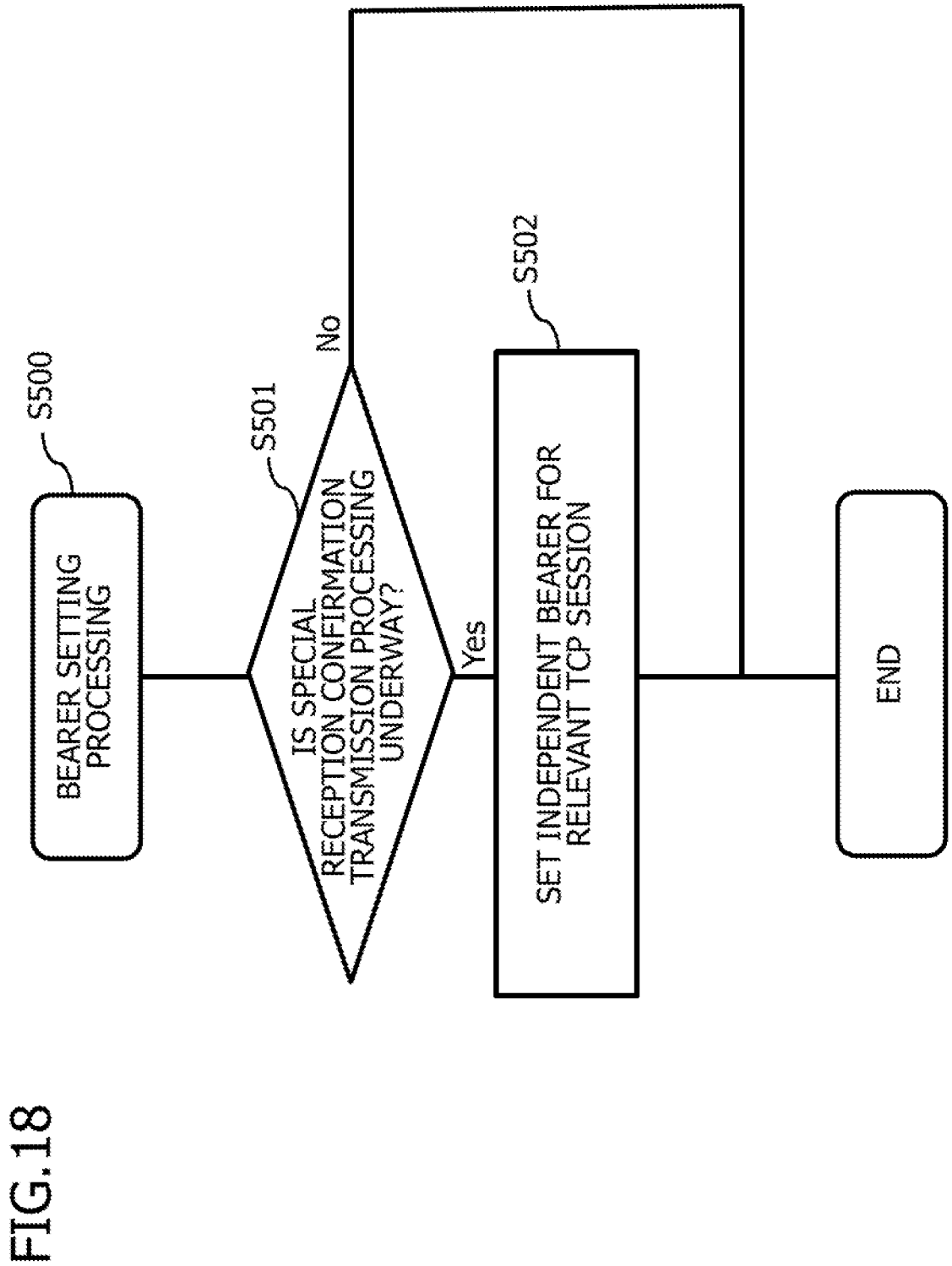
FIG. 18 is a figure depicting an example of a processing flowchart of bearer setting processing.

FIG. 18 is a figure depicting an example of a processing flowchart of bearer setting processing (S500). Note that bearer setting may be executed by any of the communication devices 100-1, 2, the relay device 200, the SGW, the PGW, and so on, for example. Further, a set bearer may be reset as appropriate. A case in which the communication device 100-1 executes bearer setting (or resetting) will be described below.

The communication device 100-1 executes the bearer setting processing (S500) when an ACK is to be transmitted. Note that the bearer setting processing (S500) may also be executed when a TCP packet is received. Further, in a case where the communication device 100-1 switches between the reception confirmation transmission processing according to each of the first to third embodiments and conventional reception confirmation processing, the bearer setting processing may be executed when switching the reception confirmation transmission processing.

The communication device 100-1 checks whether or not special reception confirmation transmission processing is underway (S501). Special reception confirmation transmission processing is the reception confirmation transmission processing according to the first to third embodiments, for example. Conversely, non-special reception confirmation transmission processing is processing for transmitting a Delayed TCP ACK, which is a single ACK transmitted when a predetermined plurality of packets have been received, or processing for transmitting an ACK every time a packet is received, for example.

When special reception confirmation transmission processing is underway (Yes in S501), the communication device 100-1 sets an independent bearer as a TCP session (referred to hereafter as the relevant TCP session) corresponding to the relevant ACK (S502). The set independent bearer may be a dedicated bearer or the default bearer. Further, the set independent bearer may be constituted by respectively different uplink and downlink bearers. Furthermore, as regards as the set independent bearer, on the downlink, a bearer may be set in a condition where a TCP session other than the relevant TCP session coexists therewith, while on the uplink only, a bearer may be set independently in order to transmit ACKs during the relevant TCP session. It is sufficient to set the independent bearer at least so that on the uplink, ACK transmission during the relevant TCP session does not coexist with another TCP session.

In the fifth embodiment, an independent bearer is set for ACK transmission. In so doing, the packets received by the communication device on the independent bearer are all relevant ACKs. Hence, header analysis can be simplified, and as a result, the processing load of the communication device can be lightened, enabling a reduction in power consumption. More specifically, in a case where a bearer that implements the special processing and a bearer that does not implement the special processing coexist, header analysis needs to be executed likewise in relation to the bearer that does not implement the special processing, but by ensuring that the respective bearers do not coexist, header analysis need only be executed on the bearer that implements the special processing.

OTHER EMBODIMENTS

The reception confirmation transmission processing, reception confirmation reception processing, packet relay processing, and bearer setting processing according to the first to fifth embodiments may respectively be combined.

For example, the reception confirmation transmission processing according to the third embodiment may be combined with the reception confirmation transmission processing according to the second embodiment. In this case, during the reception confirmation processing, ACKs are transmitted in a number corresponding to the transmission resources. Then, during the reception confirmation transmission processing, the amount of transmitted data is increased in accordance with the number of non-transmitted ACKs. As a result, the amount of transmitted data can be increased while preventing a reduction in communication speed.

Further, for example, the relay device 200 may execute the packet relay processing according to the fourth embodiment in the second and third embodiments. In this case, the relay device 200 creates the unreceived ACKs and transmits the created ACKs to the communication device, and therefore the transmitted data amount can be increased regardless of whether the communication device on the side that receives the ACK executes the reception confirmation reception processing according to the second embodiment or the third embodiment. As a result, a reduction in communication speed can be prevented.

Furthermore, for example, the communication device may execute a plurality of types of reception confirmation transmission processing, such as the reception confirmation transmission processing according to the first and second embodiments, reception confirmation transmission processing by means of using a Delayed TCP ACK, and reception confirmation transmission processing in which an ACK is transmitted every time a TCP packet is received. In this case, the communication device may switch between the various types of reception confirmation transmission processing in accordance with a radio quality relative to the relay device 200. The radio quality is a degree of interference in the radio waves used by the communication device for wireless communication, for example. When the radio quality is defective, the communication device executes reception confirmation transmission processing in which ACKs are transmitted infrequently. The reason for this is that when the radio quality is defective, a large number of coded bits need to be attached to the transmission data and a large amount of radio resources are used to resend packets and the like, whereby the amount of radio resources used for ACK transmission needs to be suppressed. Conversely, when the radio quality is favorable, the communication device executes reception confirmation transmission processing in which ACKs are transmitted frequently. The reason for this is that when the radio quality is favorable, there is no need to attach a large number of coded bits to the transmission data and packets do not have to be resent, and therefore room is available in the radio resources used for ACK transmission. The communication device 100 typically transmits data packets when an ACK is received, a predetermined amount of transmission data is generated, or a time out reaches a predetermined time. Therefore, as long as the radio resources are not occupied by ACK transmission, opportunities for packet transmission can be increased by transmitting as many ACKs as possible, and in so doing, an improvement in the throughput of wireless communication is achieved.

[Simulation]

Next, results of a simulation implemented to check the effects on the downlink throughput of the reception confirmation transmission processing according to the respective embodiments and basic reception confirmation processing will be described.

<Simulation Conditions>

Three types of reception confirmation processing, namely the reception confirmation transmission processing according to the second embodiment (referred to hereafter as Highest Ack), the reception confirmation transmission processing according to the third embodiment (referred to hereafter as Grant Ack), and reception confirmation transmission processing (referred to hereafter as Basic) corresponding to Delayed TCP ACK, in which one ACK is transmitted every time two TCP packets are received, were employed as the reception confirmation processing of the simulation.

To evaluate the effects of each type of reception confirmation transmission processing on the downlink throughput, a simulation is executed using FTP (File Transfer Protocol) communication of an infinite length file. In this simulation, a slow start mode and a congestion avoidance mode were switched intermittently. The FTP communication is completed in 97 seconds. Packets flowing into an LTE network (an EPC: Evolved Packet Core) from the external Internet flows into an eNB through a PGW and an SGW serving as gateways. A link from the SGW to the eNB is limited to 50 MB/s (Megabit/Second), which is approximately 70% of around 70 MB/s, 70 MB/s being the maximum capacity of a wireless link. As regards TCP traffic during FTP communication, a target value of a delay time of a round trip through the LTE network is 300 ms, and therefore a timer for implementing packet discarding is set. An upper limit value of the timer is set at 150 ms. Ten communication devices are disposed randomly within a communication cell range of the eNB. The main wireless parameters are set to comply with a 3GPP Case 1 model. The main parameters of the upper layer are set in consideration of the fact that a delay time when HARQ (Hybrid ARQ) is implemented three times in the wireless layer is 24 ms (eight processes resent three times). As regards packet scheduling methods, a PF (Proportional Fairness) method is used on the downlink, and an RR (Round Robin) method is used on the uplink. During FTP communication of an infinite length file, a large number of ACKs are generated, and therefore methods in which the eNB grants the communication device transmission permission (UL Grant) in advance are employed. Transmission permission is granted at a period of 5 ms.

Simulations are also performed respectively for cases in which TCP/IP header compression (ROHC: Robust Header Compression) is and is not executed.

<Simulation Results>

Results of simulations execute under the above conditions will now be described.

FIG. 19 is a graph illustrating numbers of transmitted ACKs and the downlink throughput when Basic, Highest Ack, and Grant Ack were simulated. The graph at the top of FIG. 19 illustrates the downlink throughput of each type of reception confirmation transmission processing, while the graph at the bottom illustrates the number of transmitted ACKs in each type of reception confirmation transmission processing. Further, on both graphs, the left side of each type of reception confirmation transmission processing depicts a case in which ROHC was executed, and the right side depicts a case in which ROHC was not executed.

It is evident from the graph at the top of FIG. 19 that in all of the three types of reception confirmation transmission processing, the downlink throughput was higher when ROHC was executed than when ROHC was not executed. In other words, in all types of reception confirmation transmission processing, a larger number of ACKs can be transmitted by executing ROHC, thereby eliminating asymmetry between the bands of the downlink and the uplink, and as a result, an equal communication environment to a wired environment is realized. By executing ROHC at the same time as the reception confirmation transmission processing is executed, a further improvement in throughput is achieved. Note, however, that ROHC does not necessarily have to be packaged in the communication device. When ROHC is packaged in the communication device, processing by a baseband unit increases. Moreover, when the radio quality is poor, a header compression rate decreases, and as a result, it may be impossible to obtain superior properties in a similar manner to that of the current simulations.

Further, it is evident from the graph at the bottom of FIG. 19 that, regardless of whether or not ROHC is executed, the number of transmitted ACKs decreases steadily in order of Basic, Grant Ack, and Highest Ack. Furthermore, it is evident from the graph at the top of FIG. 19 that the respective downlink throughputs of Highest Ack and Grant Ack do not decrease by a larger amount than the downlink throughput of Basic, and are better than the downlink throughput of Basic when ROHC is switched OFF, for example. In other words, when Highest Ack and Grant Ack are executed, the number of transmitted ACKs can be reduced, and moreover, a downlink throughput that is equal to or better than that of a case in which Highest Ack and Grant Ack are not executed can be realized. It may therefore be said that these methods are effective when employed in a communication device in which ROHC is not packaged.

Furthermore, by suppressing the number of transmitted ACKs, the occurrence of interference in the wireless section can be reduced and the amount of power consumed during packet transmission can be suppressed. It may therefore be said that Highest Ack, in which the smallest number of ACKs are transmitted and the downlink throughput is equal to that of Basic, is the method with which the greatest reductions in interference in the wireless section and power consumption can be achieved.

In addition, when a simulation in which the packet relay processing according to the fourth embodiment is packaged in the eNB is implemented, an even greater property improvement can be expected. In this case, a reduction of approximately 80% in the number of transmitted ACKs in comparison with a case where the packet relay processing according to the fourth embodiment is not executed can be expected in both Highest Ack and Grant Ack. An improvement in the downlink throughout in comparison with a case where the packet relay processing according to the fourth embodiment is not executed can also be expected in both Highest Ack and Grant Ack. In other words, with the packet relay processing according to the fourth embodiment, a downlink throughput that is similar to or better than that of Basic can be realized while suppressing ACK transmission.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device comprising:
    a controller configured to receive a data transmission packet from another communication device, create a reception confirmation packet indicating reception of the data transmission packet for each data transmission packet, and store the created reception confirmation packet in a transmission buffer; and
    a transmitter configured to transmit one or more reception confirmation packets selected in order from and including the most recent reception confirmation packet stored in the transmission buffer to the other communication device and discard remaining reception confirmation packets from the transmission buffer such that reception confirmation packets stored in the buffer other than the one or more transmitted reception confirmation packets are not transmitted to the other communication device, wherein
    the one or more reception confirmation packets includes a reception confirmation packet that includes a corresponding packet number indicating a transmission order of a corresponding data transmission packet,
    the communication device further comprising reception confirmation circuitry that calculates, upon reception of the reception confirmation packet, the number of unreceived reception confirmation packets from a difference between a corresponding packet number of the reception confirmation packet received last time and a corresponding packet number of the reception confirmation packet received this time, increases an amount of transmitted data of a packet by a first amount of data when the calculated number is a first difference number, and increases the amount of transmitted data of a packet by a second amount of data that is larger than the first data amount when the calculated number is a second difference number that is larger than the first difference number.

2. The communication device according to claim 1, wherein the reception confirmation packet of the one or more reception confirmation packets includes a reception confirmation packet relating to a most recently received data transmission packet.

3. The communication device according to claim 1, wherein the one or more reception confirmation packets includes a reception confirmation packet relating to a most recently received data transmission packet, and
    the transmitter varies the number of packets in the one or more reception confirmation packets in accordance with an allocated amount of transmission resources allocated to transmit packets including the reception confirmation packet.

4. The communication device according to claim 3, wherein the transmitter transmits a first number of reception confirmation packets when the transmission resources correspond to a first allocated amount, and transmits a second number of reception confirmation packets that is larger than the first number when the transmission resources correspond to a second allocated amount that is larger than the first allocated amount.

5. The communication device according to claim 4, wherein the allocated amount serves as a bandwidth of a frequency used for the transmission.

6. The communication device according to claim 3, further comprising reception confirmation circuitry that increases an amount of transmitted data of a packet every time the reception confirmation packet is received.

7. The communication device according to claim 4, further comprising reception confirmation circuitry that increases an amount of transmitted data of a packet every time the reception confirmation packet is received.

8. The communication device according to claim 1, further comprising a packet transmitter that determines the amount of transmitted data on the basis of a size of a congestion window,
    wherein the reception confirmation circuitry expands the size of the congestion window when the amount of transmitted data is increased.

9. The communication device according to claim 6, further comprising a packet transmitter that determines the amount of transmitted data on the basis of a size of a congestion window,
    wherein the reception confirmation circuitry expands the size of the congestion window when the amount of transmitted data is increased.

10. The communication device according to claim 7, further comprising a packet transmitter that determines the amount of transmitted data on the basis of a size of a congestion window,
wherein the reception confirmation circuitry expands the size of the congestion window when the amount of transmitted data is increased.

11. The communication device according to claim 1, wherein the transmitter transmits the reception confirmation packet asynchronously with reception of a packet from the other communication device.

12. The communication device according to claim 1, further comprising a packet repeater that relays a packet exchanged between a first communication device and a second communication device,
wherein the packet repeater calculates, on the basis of a corresponding packet number indicating a transmission order of a data transmission packet corresponding to a reception confirmation packet received from the first communication device, a corresponding packet number of a reception confirmation packet not transmitted from the first communication device to the second communication device, creates an additional reception confirmation packet corresponding to a data transmission packet having the calculated corresponding packet number, and in addition to the reception confirmation packet received from the first communication device, transmits the created additional reception confirmation packet to the second communication device.

13. A packet relay device comprising:
a packet repeater that relays a packet exchanged between a first communication device and a second communication device that transmits the packet to the first communication device, wherein the first communication device creates a reception confirmation packet indicating reception of a data transmission packet for each data transmission packet, stores the created reception confirmation packet in a transmission buffer, and transmits one or more reception confirmation packets selected in order from and including the most recent reception confirmation packet stored in the transmission buffer to the second communication device and discards remaining reception confirmation packets from the transmission buffer such that reception confirmation packets stored in the buffer other than the one or more transmitted reception confirmation packets are not transmitted to the second communication device; and
a reception confirmation processer that calculates, on the basis of a corresponding packet number indicating a transmission order of a data transmission packet corresponding to the reception confirmation packet received from the first communication device, a corresponding packet number of a reception confirmation packet not transmitted from the first communication device to the second communication device, creates an additional reception confirmation packet corresponding to a data transmission packet having the calculated corresponding packet number, and in addition to the reception confirmation packet received from the first communication device, transmits the created additional reception confirmation packet to the second communication device.

14. A communication system comprising:
a first communication device; and
a second communication device, wherein the second communication device transmits a packet to the first communication device, and wherein
the first communication device, which creates a reception confirmation packet indicating reception of a data transmission packet for each data transmission packet, stores the created reception confirmation packet in a transmission buffer, and transmits one or more reception confirmation packets selected in order from and including the most recent reception confirmation packet stored in the transmission buffer to the second communication device and discards remaining reception confirmation packets from the transmission buffer such that reception confirmation packets stored in the buffer other than the one or more transmitted reception confirmation packet are not transmitted to the second communication device, wherein
the one or more reception confirmation packets includes a reception confirmation packet that includes a corresponding packet number indicating a transmission order of a corresponding data transmission packet,
the first communication device further comprising reception confirmation circuitry that calculates, upon reception of the reception confirmation packet, the number of unreceived reception confirmation packets from a difference between a corresponding packet number of the reception confirmation packet received last time and a corresponding packet number of the reception confirmation packet received this time, increases an amount of transmitted data of a packet by a first amount of data when the calculated number is a first difference number, and increases the amount of transmitted data of a packet by a second amount of data that is larger than the first data amount when the calculated number is a second difference number that is larger than the first difference number.

15. The communication system according to claim 14, further comprising a packet relay device that relays a packet exchanged between the first and second communication devices,
wherein the packet relay device calculates, on the basis of a corresponding packet number indicating a transmission order of a data transmission packet corresponding to the reception confirmation packet received from the first communication device, a corresponding packet number of a reception confirmation packet not transmitted from the first communication device to the second communication device, creates an additional reception confirmation packet corresponding to a data transmission packet having the calculated corresponding packet number, and in addition to the reception confirmation packet received from the first communication device, transmits the created additional reception confirmation packet to the second communication device.

16. The communication device according to claim 1, wherein the transmitter discards reception confirmation packets other than the one or more transmitted reception confirmation packets.

17. The communication device according to claim 1, wherein the transmitter is configured to discard the reception confirmation packets other than the transmitted one or more transmitted reception confirmation packets.

18. The communication device according to claim 1, wherein the reception confirmation packets not transmitted to the other communication device include a reception confirmation packet relating to a received data transmission packet other than a most recently received data transmission packet.

\* \* \* \* \*